(12) United States Patent
Ishimaru et al.

(10) Patent No.: US 8,151,742 B2
(45) Date of Patent: Apr. 10, 2012

(54) EXHAUST GAS CLEANER

(75) Inventors: Shinya Ishimaru, Saitama (JP); Jun Iwamoto, Saitama (JP); Go Motohashi, Saitama (JP); Hitoshi Mikami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 139 days.

(21) Appl. No.: 12/812,107

(22) PCT Filed: Dec. 11, 2008

(86) PCT No.: PCT/JP2008/072529
§ 371 (c)(1),
(2), (4) Date: Jul. 8, 2010

(87) PCT Pub. No.: WO2009/087852
PCT Pub. Date: Jul. 16, 2009

(65) Prior Publication Data
US 2010/0282189 A1    Nov. 11, 2010

(30) Foreign Application Priority Data
Jan. 10, 2008  (JP) .................................. 2008-003364

(51) Int. Cl.
F02B 43/00 (2006.01)
F01N 3/00 (2006.01)
(52) U.S. Cl. .................. 123/3; 60/275; 60/286; 60/295
(58) Field of Classification Search ........ 123/3; 60/275, 60/286, 295
See application file for complete search history.

(56) References Cited

U.S. PATENT DOCUMENTS
5,471,836 A    12/1995    Takeshima et al.
(Continued)

FOREIGN PATENT DOCUMENTS
JP    06-219721 A    8/1994
(Continued)

OTHER PUBLICATIONS

T.Tanaka et al., "Development of $NO_x$ Storage-Reduction Threeway Catalyst System," Collective Papers of Society of Automotive Engineers of Japan, Oct. 1995, vol. 26, No. 4.
(Continued)

*Primary Examiner* — Noah Kamen
*Assistant Examiner* — Grant Moubry
(74) *Attorney, Agent, or Firm* — Arent Fox LLP

(57) ABSTRACT

Provided is an exhaust gas cleaner by which nitrogen oxides contained in an exhaust gas can be efficiently removed in a wide temperature range from a low temperature. The exhaust gas cleaner (10) is for use in purifying the exhaust gas discharged from an internal combustion engine (15) in which fuel is fed under periodical rich or lean conditions and burned. The cleaner (10) comprises: a reforming means (11) which generates a reforming gas comprising hydrogen and carbon monoxide; a means of low-temperature oxidation (12) which contains palladium and which thereby can oxidize and adsorb nitrogen oxides at low temperatures and oxidize the hydrogen and carbon monoxide; and a purifying means (13) which under lean conditions adsorbs nitrogen oxides and which under rich conditions releases the adsorbed nitrogen oxides and removes the released nitrogen oxides with the hydrogen and carbon monoxide present in the channel. By contriving the layout of the reforming means (11), means of low-temperature oxidation (12), and purifying means (13), nitrogen oxides contained in an exhaust gas can be removed in a wide temperature range from a low temperature.

17 Claims, 15 Drawing Sheets

U.S. PATENT DOCUMENTS

| | | | |
|---|---|---|---|
| 5,473,887 A | | 12/1995 | Takeshima et al. |
| 7,204,081 B2 * | | 4/2007 | Yasui et al. ............... 60/286 |
| 2005/0022450 A1 * | | 2/2005 | Tan et al. ............... 48/198.3 |
| 2007/0003455 A1 * | | 1/2007 | Morita et al. ............... 422/177 |
| 2008/0307779 A1 * | | 12/2008 | El-Malki et al. ............... 60/299 |

FOREIGN PATENT DOCUMENTS

| | | | |
|---|---|---|---|
| JP | 07-313877 A | | 12/1995 |
| JP | 2586738 B2 | | 12/1996 |
| JP | 2600492 B2 | | 1/1997 |
| JP | 2001-073745 A | | 3/2001 |
| JP | 2001-234737 | | 8/2001 |
| JP | 3642273 B2 | | 2/2005 |
| JP | 2005-201094 A | | 7/2005 |
| JP | 2007-132355 A | | 5/2007 |
| JP | 2007-278280 A | | 10/2007 |
| WO | WO 2005/044426 A1 | | 5/2005 |
| WO | WO 2005/103461 A1 | | 11/2005 |

OTHER PUBLICATIONS

N. Satoh et al., "A $NO_x$ Reduction System Using Ammonia Storage-Selective Catalytic Reduction in Rich and Lean Operations", 15 Aachener Kolloquium Fahrzeug- und Motorentechnik 2006, pp. 259-270.

Gongshin Qi et al., "Selective Catalytic Reduction of Nitric Oxide with Hydrogen Over Pd-Based Catalysts", Journal of Catalysis, 2006, pp. 381-392, 237.

T. Nanba et al., "Improvements in the $N_2$ Selectivity of Pt Catalysts in the $NO$-$H_2$-$O_2$ Reaction At Low Temperatures", Applied Catalysis B: Environmental, 2003, pp. 353-364, 46.

\* cited by examiner

EXHAUST GAS CLEANER

CROSS-REFERENCED TO RELATED APPLICATION

This application is a National Stage entry of International Application No. PCT/JP2008/072529, filed Dec. 11, 2008, which claims priority to Japanese Patent Application No. 2008-003364, filed Jan. 10, 2008, the disclosure of the prior application is incorporated in its entirety by reference.

TECHNICAL FIELD

The present invention relates to an exhaust gas cleaner, and in particular relates to an exhaust gas cleaner of an internal combustion engine that mainly has a lean atmosphere and can efficiently purify nitrogen oxides contained in the exhaust gas in a wide temperature range from a low temperature.

BACKGROUND ART

In recent years, nitrogen oxides in exhaust gas emitted from the internal combustion engines of power generators and automobiles into the atmosphere has been seen as a problem from the viewpoint of harmful emissions control. Nitrogen oxides become a cause of acid rain and photochemical smog, and there is movement to regulate emissions thereof globally. Due to internal combustion engines such as diesel engines and gasoline lean burn engines performing lean combustion, oxygen exists in abundance in the exhaust thereof. Among the harmful components existing in the exhaust of internal combustion engines, purification of nitrogen oxides progresses via a reduction reaction; however, since causing a reduction reaction to progress in exhaust having a high oxygen partial pressure is difficult, a variety of methods for solving this problem have been investigated.

For example, as a method to purify nitrogen oxides contained in exhaust from a lean burn internal combustion engine, a technique has been known in which nitrogen oxides are temporarily absorbed and adsorbed by passing through a nitrogen oxide storage and adsorption catalyst under lean conditions in which the exhaust becomes oxygen excessive, followed by forming a rich state in which the oxygen concentration in the exhaust gas is low by temporarily increasing the fuel injection amount, whereby the nitrogen oxides thus absorbed and adsorbed are reduced, and a variety of methods using this have been proposed.

A first method of the technique employs a nitrogen oxide absorption and purification catalyst made by combining an alkali metal such as potassium and barium, alkali earth metal, etc. with platinum, etc. This is a method in which nitrogen oxides are oxidized and absorbed on a nitrogen oxide absorption and purification catalyst in the form of $NO_3^-$ using oxygen under a lean condition, and oxygen is becomes scarce in the exhaust gas by subsequently controlling the internal combustion engine to a rich condition, and a state in which carbon monoxide and hydrocarbons are abundant is temporarily formed, while nitrogen oxides absorbed while lean are catalytically reduced and purified with high efficiency using the carbon monoxide and hydrocarbons thus emitted under the reducing atmosphere while rich (for example, refer to Non-patent Document 1, Patent Document 1, and Patent Document 2).

A second method of the technique employs an adsorption and purification catalyst made by combining ceria, platinum, a solid acid, etc. This is a method in which nitrogen oxides in the form of $NO_2$ are oxidized and adsorbed on the adsorption and purification catalyst using oxygen under a lean condition (refer to reaction formulas 1 to 3), followed by oxygen in the exhaust gas becoming scarce by controlling the internal combustion engine to a rich condition, and hydrogen is produced by causing carbon monoxide to react with water contained in the exhaust (refer to reaction formula 4). Furthermore, the hydrogen thus produced and nitrogen oxides are caused to react, when the nitrogen oxides adsorbed are removed, ammonia is produced simultaneously, and the ammonia thus produced is stored on the adsorption and purification catalyst (refer to reaction formula 5). When exposed again to a lean atmosphere, the nitrogen oxides in the exhaust are efficiently reduced and purified by way of causing the ammonia being stored and nitrogen oxides in the exhaust gas to react (refer to reaction formulas 6 to 8) (for example, refer to Non-patent Document 2 and Patent Document 3).

$$NO \rightarrow NO(ad) \qquad \text{formula 1}$$

$$2NO + O_2 \rightarrow 2NO_2(ad) \qquad \text{formula 2}$$

$$NO_2 \rightarrow NO_2(ad) \qquad \text{formula 3}$$

$$CO + H_2O \rightarrow H_2 + CO_2 \qquad \text{formula 4 (Water gas shift reaction)}$$

$$5H_2 + 2NO \rightarrow 2NH_3(ad) + 2H_2O \qquad \text{formula 5}$$

$$4NH_3 + 4NO + O_2 \rightarrow 4N_2 + 6H_2O \qquad \text{formula 6 (Low reactivity)}$$

$$2NH_3 + NO_2 + NO \rightarrow 2N_2 + 3H_2O \qquad \text{formula 7 (High reactivity)}$$

$$8NH_3 + 6NO_2 \rightarrow 7N_2 + 12H_2O \qquad \text{formula 8}$$

[In the formula, (ad) represents adsorption.]

Furthermore, as a method separate from the above, a method has been investigated, based on the first method, in which a hydrogen enrichment means, which is provided upstream of a nitrogen oxide absorption and purification catalyst composed of platinum or the like, containing an alkali metal and alkali earth metal and disposed inside an exhaust channel, and hydrogen containing gas synthesized thereby is introduced to the nitrogen oxides absorption and purification catalyst disposed downstream (for example, refer to Patent Document 4). This is a method having a different approach than the first and second methods described above because, instead of the carbon monoxide and hydrocarbons being used as a reducing agent during purification of nitrogen oxides while rich as in the first method, hydrogen is produced in an upstream hydrogen enrichment means using the carbon monoxide and hydrocarbons, and the hydrogen is used as a reducing agent for nitrogen oxides.

Furthermore, as a method separate from the above, there is a technique that enables selective reduction of nitrogen oxides in a lean atmosphere from a low temperature using hydrogen. This is a technique that uses each of palladium in a metal active species, vanadia, titania, and alumina in an oxide carrier (for example, refer to Non-patent Document 3), as well as platinum in a metal active species, and zirconia in an oxide carrier (for example, refer to Non-Patent Document 4), and makes it possible to effectively purify nitrogen oxides from a low temperature with hydrogen as a reducing agent under an oxygen excessive atmosphere in both.

Patent Document 1: Japanese Patent No. 2586738
Patent Document 2: Japanese Patent No. 2600492
Patent Document 3: WO2005/044426
Patent Document 4: Japanese Patent No. 3642273
Patent Document 5: Japanese Unexamined Patent Application Publication No. H6-219721

Patent Document 6: Japanese Unexamined Patent Application Publication No. H7-313877

Non-patent Document 1: "Development of NOx Storage Reduction Three-way Catalyst System," Collective Papers of Society of Automotive Engineers of Japan, Vol. 26, No. 4, October 1995

Non-patent Document 2: "A NOx Reduction System Using Ammonia Storage-Selective Catalytic Reduction in Rich and Lean Operation," 15. Aachener Kolloquium Fahrzeug- und Motorentechnik 2006, pp. 259-270

Non-patent Document 3: Qi, G. et al.; "Selective Catalytic Reaction of Nitric Oxide with Hydrogen over Pd-based Catalysts," Journal of Catalysis, 237, pp. 381-392 (2006)

Non-patent Document 4: Nanba, T. et al.; "Improvements in the $N_2$ Selectivity of Pt catalysts in the NO—$H_2$—$O_2$ Reaction at Low Temperature," Applied Catalysis B: Environmental, 46, pp. 353-364 (2003)

DISCLOSURE OF THE INVENTION

Problems to be Solved by the Invention

However, in the first method, the combustion state of the engine during low temperature startup is unstable, and the possibility for accidental fire thereby when performing rich control is high; therefore, rich control cannot be performed. Accordingly, a nitrogen oxide treatment method by way of an absorption-purification cycle of nitrogen oxide by repeating rich or lean conditions also cannot be applied. Therefore, during low temperature startup, only the nitrogen oxide absorption function of the catalyst works at lean conditions, and even in a case of a temperature range existing in which absorption occurs under these conditions, the treatment capacity of the nitrogen oxides in this temperature range is dramatically reduced compared to a case in which rich control is possible. In addition, the temperature at which the nitrogen oxide absorption function works efficiently is high at about 250° C. of higher at the catalyst inlet temperature, and the nitrogen oxide absorption function does not work at a catalyst temperature below this. For these reasons, there is a problem in that nitrogen oxides cannot be efficiently treated during low temperature startup of an internal combustion engine by the first method as a result.

Furthermore, when the combustion state of the internal combustion engine is made stable and a state has been entered in which rich control is possible, introduction of carbon monoxide and hydrocarbons at the stoichiometric ratio or higher of the nitrogen oxides thus absorbed becomes necessary in order to cause the nitrogen oxides thus absorbed to be sufficiently reduced. As a result, there is also a problem in that residual carbon monoxide and hydrocarbons are emitted without being purified particularly during low temperature startup. Contrary to this, although a three-way catalyst and the like are disposed downstream thereof and trials have been made that cause purification, because a temperature on the order of 300° C. is necessary for the downstream three-way catalyst to obtain sufficient purification activity of carbon monoxide and hydrocarbons, and a great deal of time is required from low temperature startup of the internal combustion engine, it does not pose an effective solution.

Furthermore, there is also a problem in that, when repeating the periodical rich or lean condition in the nitrogen oxide absorption and purification catalyst, a periodic change in the crystalline structure of the nitrogen oxide absorption and purification catalyst is repeated, and thus careful consideration in regards to catalyst durability becomes necessary.

With the second method, adsorption of nitrogen oxides under lean conditions is confirmed to occur from a low temperature compared to the first method, and the removal performance of nitrogen oxides when the catalyst temperature is a low temperature can be expected more than with the first method. In addition, since the crystalline structure of the nitrogen oxide adsorption and purification catalyst does not significantly change during adsorption-release of nitrogen oxides by way of repeating rich or lean, the durability of the catalyst also improves dramatically compared to the first method.

However, similarly to the first method, the combustion state of the engine is also unstable during low temperature startup in the second method, and the possibility for accidental fire thereby when performing rich control is high; therefore, rich control cannot be performed. Accordingly, a nitrogen oxide treatment method employing an adsorption-purification cycle of nitrogen oxide by repeating rich or lean conditions also cannot be applied. Therefore, during low temperature startup, only the nitrogen oxide adsorption function of the catalyst works at lean conditions, and even in a case of a temperature range existing in which adsorption occurs under these conditions, the treatment capacity of the nitrogen oxides is dramatically reduced compared to a case in which rich control is possible. In addition, although the temperature at which the nitrogen oxide adsorption function works efficiently under these conditions is lowered relative to the first method, nevertheless, at least about 200° C. for the catalyst inlet temperature is necessary, and the nitrogen oxide adsorption function does not work at a catalyst temperature below this. As a result, there remains a problem in that nitrogen oxides still cannot be efficiently treated during low temperature startup of the internal combustion engine even with the second method.

On the other hand, in a method in which a hydrogen enrichment means is provided upstream of the exhaust channel of a vehicle, hydrogen containing gas is synthesized therein, and nitrogen oxides are purified in a nitrogen oxide absorption and purification catalyst disposed downstream, high nitrogen oxide purification performance can be maintained while controlling emissions of carbon monoxide and hydrocarbons while rich as asserted in the Patent Document, and thus the problem of the first method can be solved. In addition, reducing agents of hydrogen and carbon monoxide are contained in the hydrogen containing gas produced from the hydrogen enrichment means, and even in a region in which rich control cannot be performed at an early stage of startup of the internal combustion engine, which is a problem in the first method and the second method, it is possible to introduce a reducing agent to the nitrogen oxide absorption and purification catalyst disposed downstream, and even in a case of only being a lean condition during low temperature startup, it is possible to turn the absorption-reduction cycle of the nitrogen oxide absorbent. As a result thereof, in a case of a temperature region existing in which absorption occurs under these conditions, the treatment capacity of the nitrogen oxides at this temperature would be reduced compared to a case in which rich control is possible, and the problems of the first method and the second method can be solved.

However, this technique employs a nitrogen oxide absorption and purification catalyst using alkali metal and alkali earth metal similarly to the first method, the temperature at which absorption works efficiently is high at about 250° C. or higher at the catalyst inlet temperature similarly to the first method, and this nitrogen oxide absorption function does not work at a catalyst temperature lower than this. For these reasons, nitrogen oxides still cannot be efficiently treated during low temperature startup of an internal combustion engine even by this method as a result.

Furthermore, in Patent Document 4, a means for combusting CO or for extracting hydrogen of steam in exhaust becomes essential in order to set ($H_2$/CO) d>1 before the converter that removes nitrogen oxides. However, there is also a problem in that, in the exhaust of the internal combustion engine for which the concentration of oxygen and steam fluctuates, it is difficult to make a combustion reaction causing only carbon monoxide to combust, a reforming reaction to extract the hydrogen of steam, or a shift reaction to continue stably, and it is more difficult to control the purification stoichiometry of the reducing agent (hydrogen) and nitrogen oxides to be constant.

In a method of selectively reducing nitrogen oxides from a low temperature in a lean atmosphere using hydrogen, the purification reaction of nitrogen oxides definitely starts from a catalyst inlet temperature of about 80° C. However, there is a problem common to these techniques in that the oxygen concentration being no more than 5% and carbon monoxide not coexisting are prerequisites, and when outside these conditions, the purification performance reduces exponentially. In an actually internal combustion engine that mainly has a lean atmosphere, the oxygen concentration inside the exhaust channel is at least 10%, and it is almost always a case in which carbon monoxide also exists; therefore, in the actual application of an internal combustion engine, sufficient purification of nitrogen oxides cannot be expected.

As a technique aimed at emissions improvement besides during low temperature startup, a method has been known in which carbon monoxide inside exhaust gas is made to combust using a low temperature oxidation catalyst (for example, refer to Patent Documents 5 and 6), etc., and harmful substances are purified earlier by raising the temperature of the catalyst arranged in a latter part up to the catalyst operating temperature by using this heat of reaction, and a method in which combustion of the internal combustion engine is controlled, and the catalyst is raised in a short time period up to the operating temperature by way of causing the exhaust gas temperature to suddenly raise.

However, in the techniques causing carbon monoxide to be combusted, the amount of carbon monoxide for an internal combustion engine mainly being a lean atmosphere is not sufficient, and thus heat of reaction cannot be generated. In addition, in the technique of controlling combustion and causing the exhaust gas temperature to suddenly raise, although a method of raising the exhaust gas temperature by continually injecting fuel also after combustion inside the internal combustion engine cylinder that is the main, since unburned hydrocarbons increase compared to normal combustion, it is not preferred also from the viewpoint of fuel efficiency and emissions.

As described above, in conventional exhaust gas cleaners, not being able to efficiently purify nitrogen oxides contained inside exhaust gas in a wide temperature range from a low temperature is the present situation. Therefore, providing an exhaust gas cleaner capable of efficiently purifying nitrogen oxides contained inside exhaust gas in a wide temperature range from a low temperature is beneficial.

The present invention was made by taking the above such problems into account, and an object thereof is to provide an exhaust gas cleaner that can efficiently purify nitrogen oxides contained in exhaust gas in a wide temperature range from a low temperature.

Means for Solving the Problems

The present inventors have diligently researched to solve the above-mentioned problems. As a result thereof, it was discovered that the above-mentioned problems could be solved by providing, in an exhaust gas cleaner of an internal combustion engine that allows combustion in periodical rich or lean conditions, a reforming means for generating a reformed gas containing hydrogen and carbon monoxide, a low temperature oxidation means for oxidizing and adsorbing nitrogen oxides from a low temperature by containing palladium as well as being able to oxidize hydrogen and carbon monoxide, and a purifying means for adsorbing nitrogen oxides in a lean condition as well as for releasing and purifying in a rich condition the nitrogen oxides thus adsorbed, and focusing on a scheme with the layout of the reforming means, low temperature oxidation means, and purifying means, arrived at completion of the present invention. More specifically, the present invention provides the following.

According to an invention of a first aspect, in an exhaust gas cleaner used in exhaust gas purification of an internal combustion engine in which fuel is supplied under periodical rich or lean conditions, and caused to combust, the exhaust gas cleaner includes: a reforming means for producing a reformed gas containing hydrogen and carbon monoxide, and introducing into an exhaust channel of the internal combustion engine; a low temperature oxidation means, which is provided inside an exhaust channel on a side further downstream than an introduction portion at which reformed gas is introduced by the reforming means, for oxidizing and adsorbing nitrogen oxides at a lower temperature than when the reforming means is not provided as well as oxidizing hydrogen and carbon monoxide, and for releasing nitrogen oxides adsorbed when a predetermined temperature has been exceeded; and a purifying means, which is provided in a vicinity of the low temperature oxidation means or inside the exhaust channel on a side further downstream than the low temperature oxidation means, for adsorbing nitrogen oxides in a lean condition as well as releasing nitrogen oxides thus adsorbed in a rich condition, and for purifying nitrogen oxides thus released by employing hydrogen and carbon monoxide existing inside a channel, in which the reforming means has at least one type of metallic catalyst component selected from the group consisting of rhodium, platinum, palladium, nickel, cobalt, and iron, and a carrier oxide containing at least one type of oxide selected from the group consisting of ceria, alumina, zirconia, titania, magnesia, and zeolite, or a complex oxide, and the low temperature oxidation means includes palladium; at least one type of a carrier oxide component selected from the group consisting of alumina, silica, zirconia, titania, ceria, and zeolite, and at least one element selected from the group consisting of lanthanum, praseodymium, yttrium, and neodymium is added to the carrier oxide component; the purifying means has: a catalyst component A containing (a) ceria, (b) praseodymium oxide, or (c) a mixture of oxides and/or a complex oxide of at least two elements selected from the group consisting of cerium, zirconium, praseodymium, neodymium, terbium, samarium, gadolinium, and lanthanum, a catalyst component B containing at least one (d) noble metal catalyst component selected from the group consisting of platinum, rhodium, palladium, and oxides thereof, and a catalyst component C containing either one or both of (e) a solid acid and (f) a solid acid on which an oxide of at least one metal selected from the group consisting of vanadium, tungsten, molybdenum, copper, iron, cobalt, nickel, and manganese is loaded; and the catalyst component B is dispersed on the catalyst component A.

According to an invention of a second aspect, in the exhaust gas cleaner as described in the first aspect, the reforming means mainly has a partial oxidation catalyst, and includes a fuel introduction means for introducing fuel from a fuel tank that stores fuel used in the internal combustion engine, and an oxygen introduction means for introducing oxygen containing gas.

According to an invention of a third aspect, in the exhaust gas cleaner as described in the first or second aspect, the reforming means is provided inside of the exhaust channel.

According to an invention of a fourth aspect, in the exhaust gas cleaner as described in the first or second aspect, the reforming means is provided independently to be separate from the exhaust channel.

According to an invention of a fifth aspect, in the exhaust gas cleaner as described in the fourth aspect, the purifying means is provided on a side further downstream than the low temperature oxidation means, and further includes an introduction means for directly introducing reformed gas produced by the reforming means to the purifying means.

According to an invention of a sixth aspect, in the exhaust gas cleaner as described in any one of the first to fourth aspects, the low temperature oxidation means and the purifying means are provided inside the same converter that is provided with a substrate, and the purifying means is disposed on the substrate, and the low temperature oxidation means is disposed to be layered on the purifying means.

According to an invention of a seventh aspect, in the exhaust gas cleaner as described in any one of the first to fourth aspects, the low temperature oxidation means and the purifying means are provided inside the same converter that is provided with a substrate, and the low temperature oxidation means is disposed on the substrate, and the purifying means is disposed to be layered on the low temperature oxidation means.

According to an invention of an eighth aspect, in the exhaust gas cleaner as described in any one of the first to fourth aspects, the low temperature oxidation means and the purifying means are provided inside the same converter that is provided with a substrate, and the low temperature oxidation means and the purifying means are disposed to be mixed on the substrate.

According to an invention of a ninth aspect, in the exhaust gas cleaner as described in any one of the first to eighth aspects, the low temperature oxidation means contains 0.1% by mass to 10% by mass of palladium.

According to an invention of a tenth aspect, in the exhaust gas cleaner as described in any one of the first to ninth aspects, the low temperature oxidation means further contains platinum and/or rhodium.

According to an invention of an eleventh aspect, the exhaust gas cleaner as described in any one of the first to tenth aspects further includes a first concentration adjustment means for adjusting a hydrogen concentration in a mixed gas of reformed gas and exhaust gas flowing into the low temperature oxidation means to a range of 0.01% by volume to 4% by volume, and for adjusting a total concentration of hydrogen and carbon monoxide to a range of 0.02% by volume to 8.1% by volume.

According to an invention of a twelfth aspect, the exhaust gas cleaner as described in any one of the first to eleventh aspects further includes a second concentration adjustment means for adjusting an oxygen concentration in a mixed gas of reformed gas and exhaust gas flowing into the low temperature oxidation means to a range of 0.3% by volume to 15% by volume.

According to an invention of a thirteenth aspect, in the exhaust gas cleaner as described in any one of the first to twelfth aspects, the purifying means includes a noble metal catalyst component containing at least one selected from the group consisting of platinum, rhodium, palladium, and oxides thereof, and a nitrogen oxide adsorption component containing at least one selected from the group consisting of alkali metals and alkali earth metals.

Effects of the Invention

According to the invention as described in the first aspect, nitrogen oxides can be efficiently purified from during low temperature startup of the internal combustion engine under broad operating conditions. The reason thereof is explained in detail below.

Under lean conditions during low temperature startup of the internal combustion engine, reformed gas containing hydrogen and carbon monoxide is generated by the reforming means, and is introduced into the exhaust channel. In a case in which the temperature of the low temperature oxidation means is low, adsorption of nitrogen oxides is begun from a low temperature range with an inlet temperature of the low temperature oxidation means of 70° C. according to the adsorption mechanism described later, and the emission of nitrogen oxides is controlled. Concurrent with this, the hydrogen and carbon monoxide inside the reformed gas thus generated from the reforming means generates oxidation heat by being oxidized in the low temperature oxidation means. When the temperature of the low temperature oxidation means becomes high, nitrogen oxides are released from the low temperature oxidation means according to the adsorption mechanism described later.

In the case of using a noble metal catalyst other than palladium, e.g., platinum, in the low temperature oxidation means, it is poisoned by the carbon monoxide contained in the reformed gas, and thus the reaction mechanism as described later cannot be obtained. As a result, the main catalyst metal of the low temperature oxidation means must be palladium. However, platinum may be contained as an additive, as described later. In addition, although an impregnation method or the like may be used when loading palladium to a carrier oxide, it is preferable to adopt a method that makes the palladium particles of a coprecipitation method to be finer.

The temperature of the catalyst contained in the purifying means rises at an earlier stage than when the reforming means and low temperature oxidation means are not provided because of the oxidation heat generated by the low temperature oxidation means. As a result thereof, the adsorption and purification activities for nitrogen oxides improve. In addition, the catalyst temperature of the purifying means rises, and when rich control becomes possible, nitrogen oxides are released from the low temperature oxidation means. For the nitrogen oxides thus released, adsorption under lean conditions and reductive purification under rich conditions are repeated in the purifying means, whereby the nitrogen oxides are efficiently purified.

When the reforming means, low temperature oxidation means, and purifying means are put together, that at least having each of the following functions is obtained.

A reforming means is obtained having functions of generating reformed gas containing hydrogen and carbon monoxide by at least using fuel used in the internal combustion engine and oxygen contained in air, and introducing into the exhaust channel. A low temperature oxidation means is obtained having functions of adsorbing nitrogen oxides from a low temperature of 70° C. and causing the exhaust gas temperature to further rise by oxidizing the hydrogen and carbon monoxide by way of the behavior of hydrogen and carbon monoxide. A purifying means is obtained having functions of possessing nitrogen oxide adsorption and purification performance by way of repeating rich or lean control, and of early stage activity becoming possible due to the exhaust gas having been raised in temperature by the behavior of the low temperature oxidation means.

Efficient purification of nitrogen oxides becomes possible under broad operating conditions from during low temperature startup by way of combining each means having the above such functions.

The nitrogen oxide adsorption mechanism of the low temperature oxidation means will be explained. The palladium particles in the low temperature oxidation means exist mainly in an oxidized state (palladium oxide) under an oxidizing atmosphere, and also normally have an ability to oxidize and adsorb nitrogen oxide. However, the palladium oxide is reduced by way of hydrogen and carbon monoxide being introduced, and change to metal palladium particles (refer to reaction formula 9 and reaction formula 10).

The palladium particles thus reduced have very high nitrogen oxide adsorptive capacity compared to palladium oxide. As a result, when the temperature of the low temperature oxidation means reaches 70° C., it becomes such that nitrogen oxides are adsorbed while being oxidized on the low temperature oxidation means (refer to reaction formula 11). At this time, the nitrogen oxides may be either nitrogen monoxide or nitrogen dioxide. Then, when reaching a temperature of at least 130° C., the hydrogen and carbon monoxide are oxidized by reacting directly with oxygen, and are consumed. As a result, the palladium particles are oxidized and again enter the state of palladium oxide. From this the nitrogen oxide adsorptive capacity decreases, and the nitrogen oxides thus adsorbed start to desorb mainly as nitrogen dioxide (refer to reaction formula 12). Although the emission amount becomes large with a rise in temperature, the adsorption performance can be maintained up to 150° C. In other words, "predetermined temperature" in the present invention indicates 130° C.

$$2PdO+2H_2 \rightarrow 2Pd(*)+2H_2+O_2 \quad \text{formula 9-1}$$

$$PdO+CO \rightarrow Pd(*)+CO_2 \quad \text{formula 9-2}$$

$$NO+O_2+Pd(*) \rightarrow NO_3(ad)+Pd(*) \quad \text{formula 10-1}$$

$$NO_2+O_2+Pd(*) \rightarrow 2NO_3(ad)+Pd(*) \quad \text{formula 10-2}$$

$$2Pd(*)+O_2 \rightarrow 2PdO \quad \text{formula 11}$$

$$2NO_3(ad)+PdO \rightarrow 2NO_2+O_2+PdO \quad \text{formula 12}$$

[In the formula, Pd (*) represents palladium particles, and (ad) represents adsorption.]

According to the invention as described in the second aspect, the reforming means is characterized by mainly having a partial oxidation catalyst, and being provided with the fuel introduction means for introducing fuel from the fuel tank that stores fuel used in the internal combustion engine, and an oxygen introduction means for introducing oxygen containing gas. As a result, the partial oxidation reaction, which at least uses the fuel used in the internal combustion engine and oxygen containing gas, mainly progresses, and reformed gas containing more carbon monoxide than hydrogen is produced. From this, it is not necessary to prepare water, which is made necessary in the steam reforming reaction, etc., for example. In addition, it is also not necessary to add a carbon monoxide selective oxidation means, CO water gas shift means or the like, and thus it becomes possible to reduce the size of the device and lower cost. In addition, it also has an effect of the production of reformed gas being possible quickly even during low temperature startup.

Herein, a method has been known that generally uses the follow three reactions as a technique to produce hydrogen containing gas using fuel.

$$6CnH1.8n+3nO_2 \rightarrow 6nCO+5.4nH_2 \quad \text{formula 13 (Partial oxidation reaction (POx))}$$

$$6CnH1.8n+2nO_2+2nH_2O \rightarrow 6nCO+7.4nH_2 \quad \text{formula 14 (Autothermal reforming reaction (ATR))}$$

$$6CnH1.8n+6nH_2O \rightarrow 6nCO+11.4nH_2 \quad \text{formula 15 (Steam reforming reaction (SR))}$$

[In the formula, the water gas shift reaction is not included. The fuel used is diesel oil (C:H=1:1.8).]

In the invention as described in the second aspect, the partial oxidation reaction shown in reaction formula 13 is mainly employed. As shown in reaction formula 13, this partial oxidation reaction differs from other reactions, and is characterized by the content of carbon monoxide inside the reformed gas thus produced being larger than the content of hydrogen. Generally, it has been known that the hydrogen production efficiency is increased by using water as a reactant. However, when considered on-board of a vehicle, a component for supplying water must be newly added, and thus brings about an increase in the size of the device and increased cost. In addition, the reaction using water is an endothermic reaction, and thus it is necessary to supply heat from outside. This means that a large amount of heat is necessary in order to startup the reforming means, and time for startup is necessary particularly during low temperature startup. Furthermore, in the present invention, it is preferable for carbon monoxide to be relatively abundant due to carbon monoxide contributing to an improvement in the purification efficiency of the purifying means, as described above. Therefore, in the present invention, mainly progression of the partial oxidation reaction is more effective in the reforming means, and as a result, not only a reduction in the size of the device, cost reduction, and shortening of startup become possible, but also an improvement in nitrogen oxide purification performance.

In addition, in the reforming means, the amount of heat generated can be used in raising the exhaust gas temperature by mainly causing the partial oxidation reaction, which is an exothermal reaction, to progress. In other words, it becomes possible to make the reformed gas having a temperature higher than the temperature of the exhaust gas flowing inside the exhaust channel to merge with the exhaust gas, a result of which a rise in the catalyst temperatures of the low temperature oxidation means and the purifying means is promoted, and the adsorption start time and the purification start time can be made short.

The invention as described in the third aspect is characterized by the reforming means being provided inside the exhaust channel, and the invention as described in the fourth aspect is characterized by the reforming means being provided independently to be separate from exhaust channel. According to these inventions, it is possible to efficiently produce reformed gas containing hydrogen and carbon monoxide, and it is possible to efficiently supply the reformed gas containing hydrogen and carbon monoxide to the low temperature oxidation means. As a result, adsorption of nitrogen oxides can be realized in the low temperature oxidation means at a low temperature. In addition, it becomes possible to reduce the size of the device and lower cost.

The invention as described in the fifth aspect is characterized by further including an introduction means for directly introducing reformed gas produced by the reforming means into the purifying means. As a result, according to the present invention, even in a case such that hydrogen and carbon monoxide are consumed by the low temperature oxidation means under rich conditions, leading to the nitrogen oxide reduction performance of the purifying means decreasing, it is possible to promote reduction of nitrogen oxides by supplying a portion or the total amount of hydrogen and carbon monoxide produced by the reforming means directly to the purifying means. Therefore, a reduction in the nitrogen oxide reduction performance of the purifying means can be suppressed at high temperatures by providing the low temperature oxidation means. It should be noted that performing reduction of nitrogen oxides using hydrogen and carbon monoxide with the purifying means, due to being after the purifying means has been activated, is different from a temperature range that necessitates reformed gas by the low temperature oxidation means.

In the inventions as described in the sixth to eighth aspects, the low temperature oxidation means and the purifying means are characterized by being provided inside the same converter provided with a substrate. More specifically, the invention as described in the sixth aspect is characterized by the purifying means being disposed on the substrate, and the low temperature oxidation means being disposed to be layered on the purifying means. The invention as described in the seventh aspect is characterized by the low temperature oxidation means being disposed on the substrate, and the purifying means being disposed to be layered on the low temperature oxidation means. The invention as described in the eighth aspect is characterized by the low temperature oxidation means and the purifying means being disposed to be mixed on the substrate. It is possible to efficiently purify nitrogen oxides under broad operating conditions from during low temperature startup by disposing the low temperature oxidation means and the purifying means as in these inventions.

According to the invention as described in the ninth aspect, from the content of palladium in the low temperature oxidation means being 0.1% by mass to 10% by mass, nitrogen oxides can be efficiently adsorbed, and low temperature combustion of reformed gas becomes possible. In a case of the content of palladium being less than 0.1% by mass, the adsorption rate of nitrogen oxides under 100° C. stays at a few percent, for example, which is not preferable since nitrogen oxide adsorption performance is not sufficiently exhibited. This is a result of the nitrogen oxide adsorption sites on palladium particles lacking due to the palladium content being small. Contrary to this, by setting the content of palladium to at least 0.1% by mass, the nitrogen oxide adsorption sites on palladium particles that can contact reactant gas per unit mass increases, a result of which the nitrogen oxide adsorption performance improves greatly. When the palladium content reaches 4% by mass, the nitrogen oxide adsorption rate becomes on the order of 90% under 120° C., for example. However, in a case of having set a palladium content that exceeds 10% by mass, sintering of the palladium particles becomes easy due to there being a limit in the surface area of the adsorbent (low temperature oxidation means), and thus the nitrogen oxide adsorption sites do not necessarily increase proportionally. As a result, the nitrogen oxide adsorption amount becomes a saturated state with respect to an increase in palladium content. Therefore, an addition of palladium that exceeds 10% by mass is not preferable since an effective improvement in adsorption amount cannot be expected and being unfavorable in terms of economy and cost.

According to the invention as described in the tenth aspect, the low temperature oxidation means is characterized by further containing platinum and/or rhodium. As described above, in a case of using a precious metal catalyst other than palladium, e.g., platinum, in the low temperature oxidation means, there is poisoning by the carbon monoxide contained in the reformed gas, and thus the reaction mechanism described above cannot be obtained. However, platinum may be added so long as it is within a range that does not obstruct the reaction mechanism according to palladium. In addition, by employing a low temperature oxidation means that containing rhodium in addition to palladium, it is possible to lower the carbon monoxide oxidation initiation temperature when hydrogen has been added.

According to the invention as described in the eleventh aspect, the adsorption rate of nitrogen oxides can be further improved by further including a first concentration adjustment means for adjusting the hydrogen concentration in the mixed gas of reformed gas and exhaust gas to a range of 0.01% by volume to 4% by volume flowing into the low temperature oxidation means, and for adjusting the total concentration of hydrogen and carbon monoxide to a range of 0.02% by volume to 8.1% by volume. In a case of the total concentration of hydrogen and carbon monoxide being less than 0.02% by volume, the adsorption rate stays at 20% under 100° C., which is not preferable since nitrogen oxide adsorption performance is not sufficiently exhibited. In addition, in a case of the hydrogen concentration being less than 0.01% by volume, the adsorption rate stays at 50% under 100° C. even by increasing the carbon monoxide concentration, which is not preferable since nitrogen oxide adsorption performance is not sufficiently exhibited. This is because a change from palladium oxide to palladium particles does not sufficiently occur due to the total concentration of hydrogen and carbon monoxide being small. By setting the hydrogen concentration to be at least 0.01% by volume, the change ratio from palladium oxide to palladium particles under low temperature becomes larger than when only carbon monoxide is added, a result of which the nitrogen oxide adsorption performance at lower temperatures improves. When the content of hydrogen reaches 0.5% by volume, the adsorption rate under 100° C. is on the order of 90%. However, even in a case where the total concentration of hydrogen and carbon monoxide exceeds 5% by volume, the combustion reaction amounts of hydrogen and oxygen increase from about 100° C. and higher, the catalyst temperature is raised by combustion heat imparted to the catalyst, and thus desorption of nitrogen oxides is promoted. As a result, the nitrogen oxide adsorption amount does not necessary increase proportionally, and the nitrogen oxide adsorption amount becomes a saturated state with respect to an increase in palladium content. Therefore, in a case of the hydrogen concentration exceeding 4% by volume and in a case of the total concentration of hydrogen and carbon monoxide exceeding 8.1% by volume, an improvement in the effective adsorption amount cannot be expected, and is not preferable due to becoming unfavorable in terms of economy and cost.

According to the invention as described in the twelfth aspect, it is possible to further improve the adsorption rate of nitrogen oxides by further including a second concentration adjustment means for adjusting the oxygen concentration inside the mixed gas of reformed gas and exhaust gas flowing into the low temperature oxidation means to a range of 0.3% by volume to 15% by volume. In a case of the oxygen concentration inside the mixed gas of reformed gas and exhaust gas being less than 0.3% by volume, the adsorption rate of nitrogen oxides under 100° C. stays at a few percent, which is not preferable since nitrogen oxide adsorption performance is not sufficiently exhibited. This is because, although oxygen inside the exhaust gas is made necessary when adsorbing nitrogen oxides, as shown in the above-mentioned reaction formula 10, in a case where the oxygen concentration is less than 0.3% by volume, sufficient nitrogen oxides cannot be in the state of $NO_3^-$. Therefore, the change of nitrogen oxides to $NO_3$ becomes easy by raising the oxygen concentration, and the nitrogen oxide adsorption performance improves greatly. When the oxygen concentration reaches 10% by volume, the adsorption rate under 150° C. becomes on the order of 90%. However, when the oxygen concentration is too high, the catalyst temperature is raised by the combustion heat imparted to the catalyst due to contributing to the temperature lowering of the combustion reaction with hydrogen from about 100° C., a result of which desorption of nitrogen oxides is promoted. In addition, when the oxygen concentration is too high, the nitrogen oxide adsorption amount has a slight downward trend. For the oxygen concentration in the gas flowing inside the internal combustion engine, normally the oxygen concentration inside air does not exceed 21% by volume, and in order to raise the oxygen concentration above this, separate introduction of an oxygen introduction device or the like becomes necessary, and thus is not preferable due to being unfavorable in terms of cost. In addition, even if the oxygen concentration exceeds 15% by volume, a better nitrogen oxide adsorption rate cannot be expected, and thus it is preferable for the oxygen concentration in the mixed gas of reformed gas and exhaust gas not to exceed 15% by volume.

According to the invention as described in the thirteenth aspect, the purifying means can more efficiently purify nitrogen oxides under a broad operating range from during low temperature startup of the internal combustion engine by including a metal catalyst component containing at least one selected from the group consisting of platinum, rhodium, palladium, and oxides thereof, and a nitrogen oxide adsorption component containing at least one selected from the group consisting of alkali metals (Li, Na, K, Rb, Cs) and alkali earth metals (Mg, Ca, Sr, Ba). In addition, as described above, since the low temperature oxidation means has an oxidation function from a low temperature under lean conditions, carbon monoxide and hydrocarbons existing in the exhaust channel can be reduced, according to the present invention. Moreover, when the necessary oxygen concentration inside the exhaust channel is also at least 0.3% by volume when adsorbing nitrogen oxides at low temperature, use in a wide range is possible. Therefore, the present invention can solve the problem in the techniques explained in the prior art (refer to Non-patent Document 3 and Non-patent Document 4) that can selectively reduce nitrogen oxides from a low temperature using hydrogen under lean conditions makes assumptions of the oxygen concentration being no more than 5%, which is in common, and of carbon monoxide not coexisting, and the purification performance suddenly declines when outside these conditions. Furthermore, it is considered that, in an actual internal combustion engine that is mainly a lean condition, the problem in that sufficient purification performance of nitrogen oxides cannot be expected in application of an internal combustion engine, which is almost always a case in which the oxygen concentration inside the exhaust channel is at least 10% and carbon monoxide also exists, can be sufficiently solved thereby.

Figure 1:
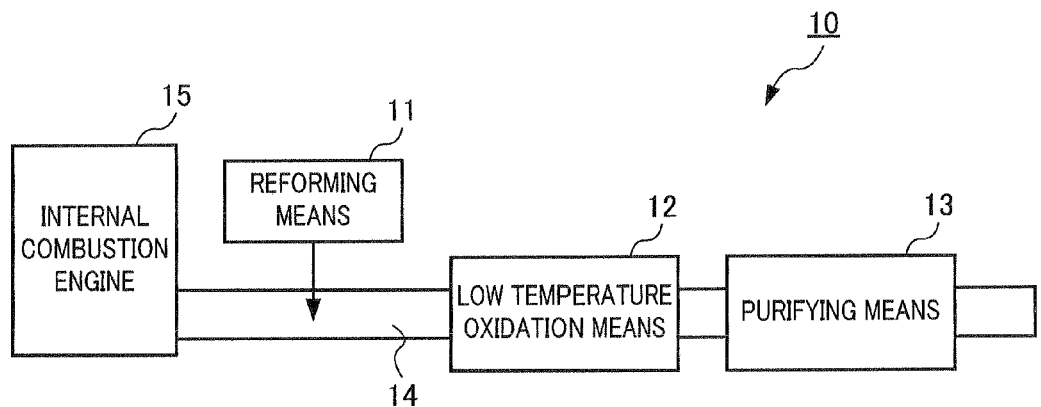
FIG. 1 is a schematic diagram of an exhaust gas cleaner of a first embodiment.

EXPLANATION OF REFERENCE NUMERALS 10, 20, 30, 40, 50, 60, 70, 80, 90 exhaust gas cleaner
11, 21, 31, 41, 51, 61, 71, 81, 91 reforming means
12, 22, 92 low temperature oxidation means
13, 23, 93 purification means
14, 24, 34, 44, 54, 64, 74, 84, 94 exhaust channel
15, 25, 35, 45, 55, 65, 75, 85, 91 internal combustion engine
96 introduction means

PREFERRED MODE FOR CARRYING OUT THE INVENTION

Embodiments of the present invention are explained in detail below while referring to the drawings. It should be noted that, in the descriptions from the second embodiment onward, for configurations, operations, and effects that are redundant with the first embodiment, explanations are omitted where appropriate.

First Embodiment

A schematic diagram of an exhaust gas cleaner 10 of the present embodiment is shown in FIG. 1. As shown in FIG. 1, the exhaust gas cleaner 10 is characterized by being provided in the exhaust system of an internal combustion engine 15, and includes a reforming means 11, a low temperature oxidation means 12, a purification means 13, and an exhaust channel 14.

The internal combustion engine 15 is a diesel engine that directly injects fuel inside the combustion chamber of each cylinder. The internal combustion engine 15 is operated by setting an engine air-fuel ratio to normally be on a side leaner than the stoichiometric ratio, in which enrichment control to set the engine air-fuel ratio to be on a side richer than the stoichiometric ratio is periodically performed.

The reforming means 11 is provided to be separate from the exhaust channel 14. Reformed gas containing hydrogen and carbon monoxide is produced in the reforming means 11. The reformed gas thus produced is led by an introduction portion (not illustrated) and introduced into the exhaust channel 14 on an upstream side.

The reforming means 11 is provided with a reforming catalyst, and this reforming catalyst has a metallic catalyst component containing at least one selected from the group consisting of rhodium, platinum, palladium, nickel, cobalt, and iron, and a carrier oxide composed of at least one type of oxide selected from the group consisting of ceria, alumina, zirconia, titania, magnesia, and zeolite, or a complex oxide. In other words, the above metallic catalyst component is supported on these carrier oxides.

Among the above reforming catalysts, that using rhodium as the metallic catalyst component that is an active group is preferred, and additionally, that using ceria as the carrier oxide is preferred. In particular, it is preferably to use a reforming catalyst made by loading rhodium on a carrier oxide using ceria.

It is preferable for the reforming means 11 to mainly contain a partial oxidation catalyst. In addition, it is preferable to have provided a fuel introduction means (not illustrated) for introducing fuel from a fuel tank (not illustrated) that stores fuel used in the internal combustion engine 15, and an oxygen introduction means (not illustrated) such as a compressor for introducing oxygen containing gas. Moreover, a circulation means (not illustrated) for causing fuel remaining in the exhaust gas to be circulated and led to the reforming catalyst may be provided. As a result, using at least the fuel and oxygen containing gas employed in the internal combustion engine 15, reformed gas containing more carbon monoxide than hydrogen is produced, and it is possible to make high temperature reformed gas by way of mainly the partial oxidation reaction.

The production method of the reforming catalyst exemplified above is not particularly limited, and is produced by a well-known conventional method. For example, after producing a slurry containing the above metallic catalyst component, the reforming catalyst is obtained after immersing a honeycomb support composed of the above carrier oxide inside the slurry, by extracting therefrom and calcining.

The low temperature oxidation means 12 is provided with a low temperature oxidation catalyst, and this low temperature oxidation catalyst has palladium and at least one carrier oxide component selected from the group consisting of alumina, silica, zirconia, titania, ceria, and zeolite, and has added to the carrier oxide component at least one element selected from the group consisting of lanthanum, praseodymium, yttrium, and neodymium. Among these low temperature oxidation catalysts, one containing 0.1% by mass to 10% by mass of palladium is preferred, and additionally, one containing rhodium as an additive is preferred. A more preferred content of palladium is 5% by mass to 6% by mass.

The production method of the above low temperature oxidation catalyst is not particularly limited, and is produced by a well-known conventional method. For example, after producing a slurry containing the elements exemplified above, the low temperature catalyst is obtained after immersing a honeycomb support composed of the above carrier oxide into the slurry, by extracting therefrom and calcining.

Herein, it is preferred to further include a first concentration adjustment means (not illustrated) for adjusting the hydrogen concentration in the mixed gas of reformed gas and exhaust gas flowing into the low temperature oxidation means 12 to a range of 0.01% by volume to 4% by volume, and for adjusting the total concentration of hydrogen and carbon monoxide to a range of 0.02% by volume to 8.1% by volume. As a result, it is possible to further improve the nitrogen oxide adsorption rate in the low temperature oxidation means 12. It is preferable for the first concentration adjustment means to be provided with an adjustment valve that adjusts the amount of reformed gas introduced into the exhaust channel 14, a first detection means for detecting the hydrogen concentration and carbon monoxide concentration in the mixed gas flowing into the low temperature oxidation means, and an electrical control unit that adjusts an aperture of the adjustment valve based on the concentrations detected by the first detection means.

In addition, it is preferred to further include a second concentration adjustment means (not illustrated) for adjusting the oxygen concentration in the mixed gas of reformed gas and exhaust gas flowing into the low temperature oxidation means 12 to a range of 0.3% by volume to 15% by volume. As a result, it is possible to further improve the nitrogen oxide adsorption rate in the low temperature oxidation means 12. It is preferable for the second concentration adjustment means to be provided with a second detection means for detecting the oxygen concentration inside the mixed gas flowing into the low temperature oxidation means 12, and an electronic control unit that makes rich or lean control possible by outputting a control signal to a throttle valve, EGR valve, turbocharger, fuel injectors (none of which are illustrated) based on the concentration detected by this second detection means.

The purification means 13 is characterized by being provided with a purification catalyst composed of a catalyst component A, a catalyst component B, and a catalyst component C. The catalyst component A is composed of (a) ceria, (b) praseodymium oxide, or (c) a mixture of oxides and/or a complex oxide of at least two elements selected from the group consisting of cerium, zirconium, praseodymium, neodymium, terbium, samarium, gadolinium, and lanthanum. The catalyst component B is composed of at least one type of precious metal catalyst component selected from the group consisting of (d) platinum, rhodium, palladium, and an oxide of these. The catalyst component B is in a dispersed state on the catalyst component A. The catalyst component C is composed of either one of (f) a solid acid and (g) a solid acid supporting at least one oxide of a metal selected from the group consisting of vanadium, tungsten, molybdenum, copper, iron, cobalt, nickel, and manganese, or both.

That containing a noble metal catalyst component composed of at least one selected from the group consisting of platinum, rhodium, palladium, and oxides of these, and a nitrogen oxide adsorption component composed of at least one selected from the group consisting of alkali metals and alkali earth metals may be used as the above purification catalyst.

The production method of the above purification catalyst is not particularly limited, and is produced by a well-known conventional method. A honeycomb form is preferred as the support.

It should be noted that it is preferred for an exhaust converter, which is not illustrated, to be provided on an upstream side of the exhaust channel 14, i.e. on a side further upstream than an introduction portion at which reformed gas is introduced. For example, it is preferred that a first exhaust converter is provided that has an oxidation catalyst built-in, and purifies the exhaust by action of this catalyst, while raising the temperature of the exhaust. More specifically, it is preferable to equip an oxidation catalyst, which contains a zeolite excelling in a hydrocarbon (HC) adsorption action and rhodium (Rh) excelling in a HC steam reforming action have been added, in a material having platinum (Pt) used as a catalyst loaded on a alumina ($Al_2O_3$) carrier.

In addition, it is preferable to provide a second exhaust converter that has built in a particulate matter collection device (hereinafter referred to as "DPF" (Diesel Particulate Filter)) between the introduction portion at which reformed gas is introduced and the first exhaust converter. The DPF collects soot as particulates mainly composed of carbon in the exhaust when exhaust passes through fine pores of the filter walls by causing to deposit on the surface of the filter walls and in the pores inside the filter walls. A ceramic such as silicon carbide (SiC) or a metallic porous medium is employed as the constituent material of the filter walls. In addition, the second exhaust converter may be provided with a NOx purification catalyst or the like in addition to the DPF.

Operational effects of the exhaust gas cleaner 10 of the present embodiment will be explained. First, reformed gas containing hydrogen and carbon monoxide is produced by way of the reforming means 11 under lean conditions during low temperature startup of the internal combustion engine 15, and is introduced into the exhaust channel 14. In a case where the temperature of the low temperature oxidation means 12 is low, adsorption of nitrogen oxides is initiated from a low temperature region at an inlet temperature of the low temperature oxidation means 12 of 70° C., and thus the emission of nitrogen oxides is controlled. Concurrent with this, hydrogen and carbon monoxide inside the reformed gas thus produced from the reforming means 11 generates oxidation heat by being oxidized by the low temperature oxidation means 12. When the temperature of the low temperature oxidation means 12 becomes high, the nitrogen oxides are released from the low temperature oxidation means 12.

The temperature of the purification catalyst contained in the purifying means 13 raises at an earlier stage than if the reforming means 11 and the low temperature oxidation means 12 were not provided due to oxidation heat generated by the low temperature oxidation means 12. As a result, adsorption of nitrogen oxides and purification activity improve. In addition, the catalyst temperature of the purifying means 13 raises, and the nitrogen oxides are released from the low temperature oxidation means 12 when the rich control becomes possible. The nitrogen oxides thus released are efficiently purified in the purifying means 13 by way of repeating adsorption under lean conditions and reductive purification under rich conditions.

Second Embodiment

Figure 2:
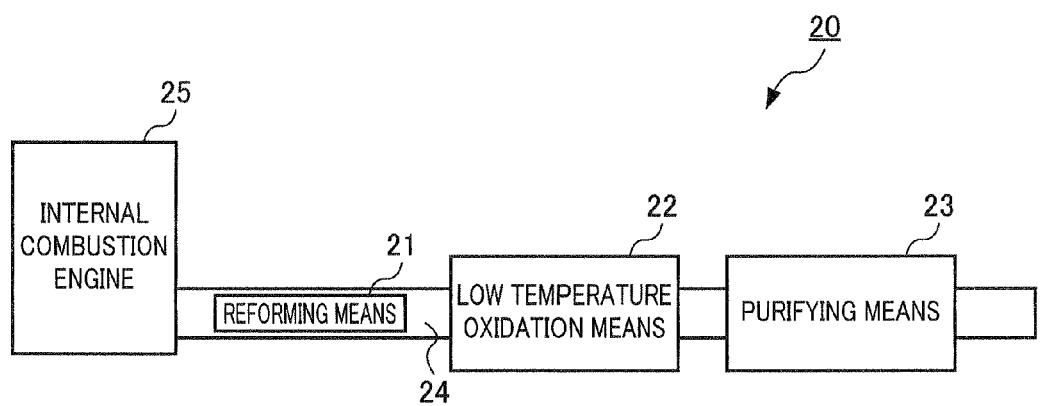
FIG. 2 is a schematic diagram of an exhaust gas cleaner of a second embodiment.

A schematic diagram of an exhaust gas cleaner 20 of the present invention is shown in FIG. 2. As shown in FIG. 2, the exhaust gas cleaner 20 is a configuration similar to the exhaust gas cleaner 10 of the first embodiment, except for a reforming means 21 being provided inside an exhaust channel 24.

According to the exhaust gas cleaner 20 of the present embodiment, in addition to exerting effects similar to the exhaust gas cleaner 10 of the first embodiment, it is possible to efficiently supply reformed gas containing hydrogen and carbon monoxide to a low temperature oxidation means 22. As a result, it is possible to more reliably realize adsorption of nitrogen oxides at low temperature in the low temperature oxidation means 22. In addition, from providing the reforming means 21 inside the exhaust channel 24, it becomes possible to reduce the size of the device and lower cost.

Third Embodiment

Figure 3:
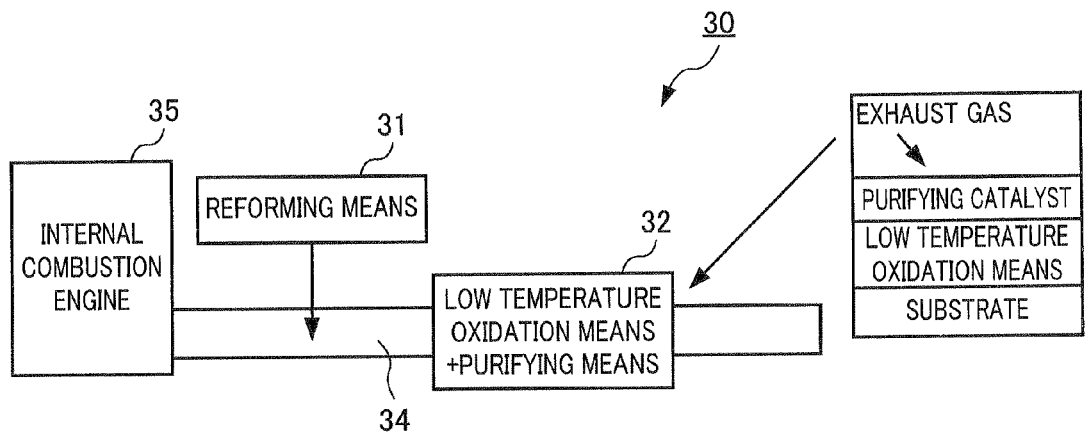
FIG. 3 is a schematic diagram of an exhaust gas cleaner of a third embodiment.

A schematic diagram of an exhaust gas cleaner 30 of the present embodiment is shown in FIG. 3. As shown in FIG. 3, the exhaust gas cleaner 30 is a configuration similar to the exhaust gas cleaner 10 of the first embodiment, except for the low temperature oxidation means and the purifying means being provided inside the same converter 32. The converter 32 is provided with a substrate, and the low temperature oxidation means is disposed on this substrate, and the purifying means is disposed to be layered on this low temperature oxidation means.

According to the exhaust gas cleaner 30 of the present embodiment, in addition to exerting similar effects to the exhaust gas cleaner 10 of the first embodiment, oxidation heat generated from the oxidation reaction of hydrogen and carbon monoxide in the low temperature oxidation means spreads efficiently in the purifying means, a result of which a higher nitrogen oxide purification rate is obtained. In addition, since the low temperature oxidation means and the purifying means are housed inside the same converter, it becomes possible to reduce the size of the device and lower cost.

Fourth Embodiment

Figure 4:
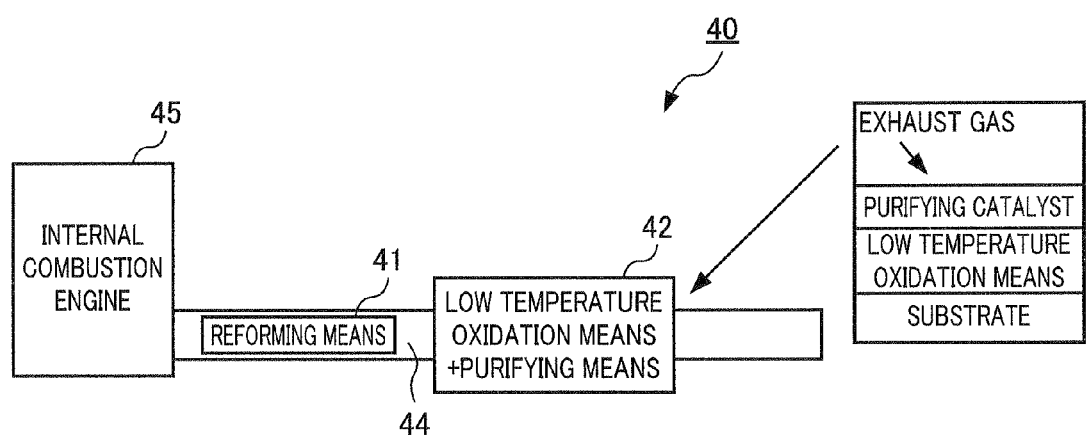
FIG. 4 is a schematic diagram of an exhaust gas cleaner of a fourth embodiment.

A schematic diagram of an exhaust gas cleaner 40 of the present embodiment is shown in FIG. 4. As shown in FIG. 4, the exhaust gas cleaner 40 is a configuration similar to the exhaust gas cleaner 30 of the third embodiment, except for a reforming means 41 being provided inside an exhaust channel 44.

According to the exhaust cleaner 40 of the present embodiment, in addition to exerting similar effects to the exhaust gas cleaner 30 of the third embodiment, it becomes possible to further reduce the size of the device and lower cost from the reforming means 41 being provided inside the exhaust channel 44.

Fifth Embodiment

Figure 5:
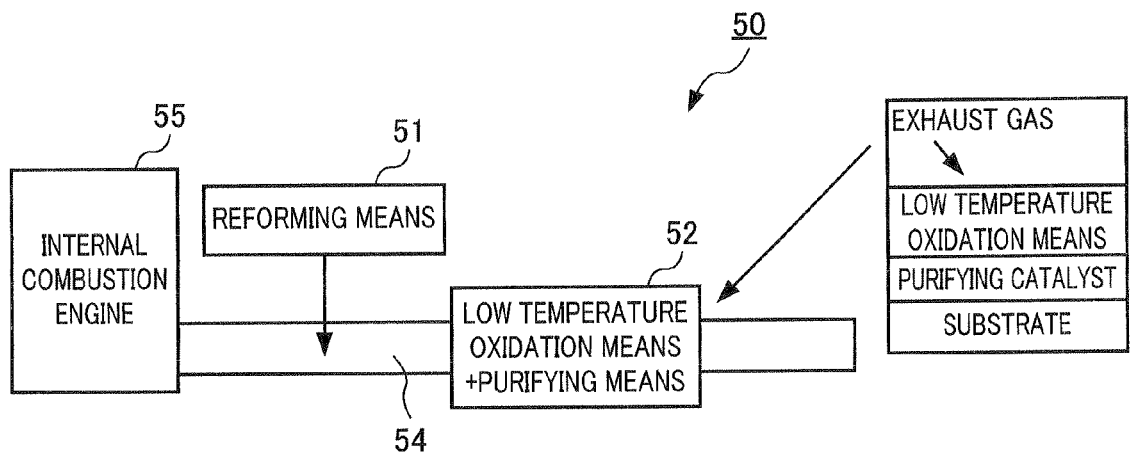
FIG. 5 is a schematic diagram of an exhaust gas cleaner of a fifth embodiment.

A schematic diagram of an exhaust gas cleaner 50 of the present embodiment is shown in FIG. 5. As shown in FIG. 5, the exhaust gas cleaner 50 is a configuration similar to the exhaust gas cleaner 10 of the first embodiment, except for the low temperature oxidation means and the purifying means being provided inside the same converter 52. The converter 52 is provided with a substrate, the purifying means is disposed on this substrate, and the low temperature oxidation means is disposed to be layered on this purifying means.

According to the exhaust gas cleaner 50 of the present embodiment, in addition to exerting similar effects to the exhaust gas cleaner 10 of the first embodiment, oxidation heat generated from the oxidation reaction of hydrogen and carbon monoxide in the low temperature oxidation means spreads efficiently in the purifying means, a result of which a higher nitrogen oxide purification ratio is obtained. In addition, since the low temperature oxidation means and the purifying means are housed inside the same converter, it becomes possible to reduce the size of the device and lower cost.

Sixth Embodiment

Figure 6:
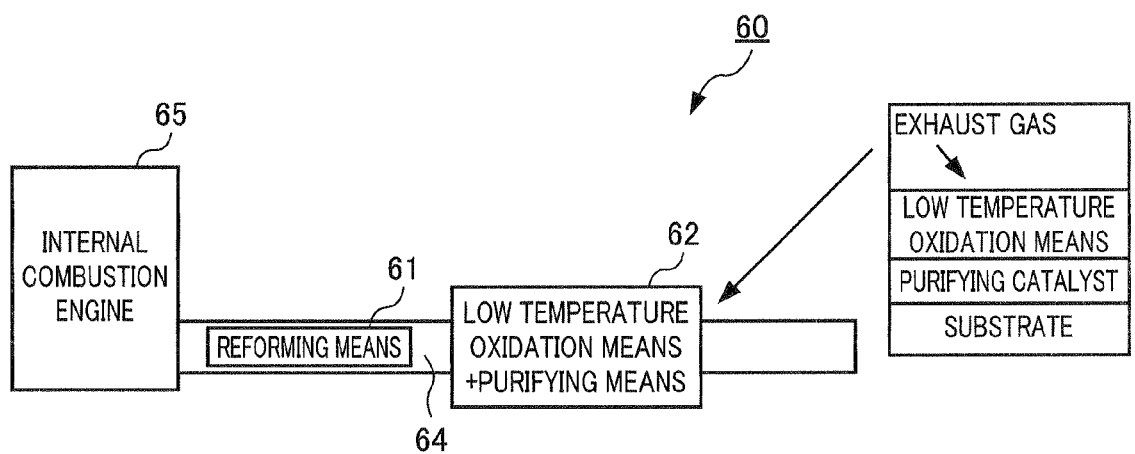
FIG. 6 is a schematic diagram of an exhaust gas cleaner of a sixth embodiment.

A schematic diagram of an exhaust gas cleaner 60 of the present embodiment is shown in FIG. 6. As shown in FIG. 6, the exhaust gas cleaner 60 is a configuration similar to the exhaust gas cleaner 50 of the fifth embodiment, except for a reforming means 61 being provided inside an exhaust channel 64.

According to the exhaust gas cleaner 60 of the present embodiment, in addition to exerting similar effects to the exhaust gas cleaner 50 of the fifth embodiment, it becomes possible to further reduce the size of the device and lower cost from the reforming means 61 being provided inside the exhaust channel 64.

Seventh Embodiment

Figure 7:
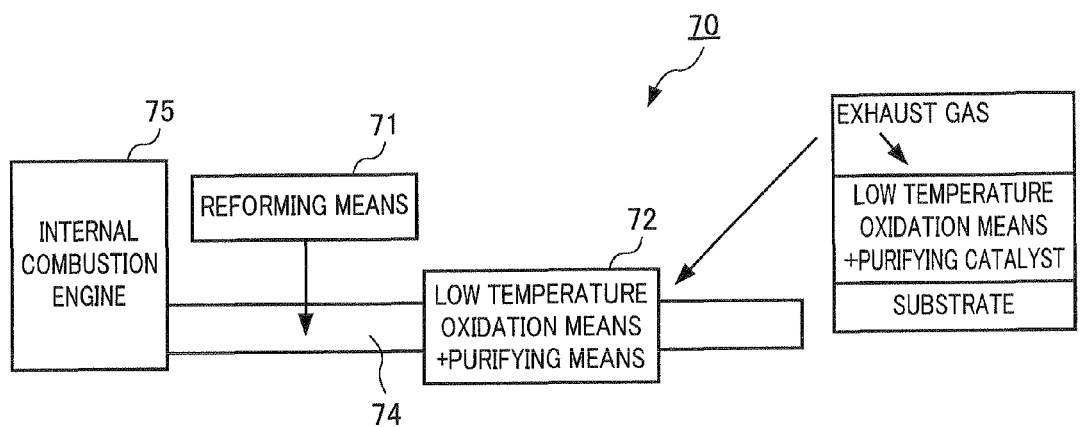
FIG. 7 is a schematic diagram of an exhaust gas cleaner of a seventh embodiment.

A schematic diagram of an exhaust gas cleaner 70 of the present embodiment is shown in FIG. 7. As shown in FIG. 7, the exhaust gas cleaner 70 is a configuration similar to the exhaust gas cleaner 10 of the first embodiment, except for the low temperature oxidation means and the purifying means being provided inside the same converter 72. The converter 72 is provided with a substrate, and the low temperature oxidation means and the purifying means are disposed to be mixed on this substrate.

According to the exhaust gas cleaner 70 of the present embodiment, in addition to exerting similar effects to the exhaust gas cleaner 10 of the first embodiment, oxidation heat generated from the oxidation reaction of hydrogen and carbon monoxide in the low temperature oxidation means spreads more efficiently in the purifying means, a result of which an even higher nitrogen oxide purification rate is obtained. In addition, since the low temperature oxidation means and the purifying means are mixed and housed inside the same converter, it becomes possible to reduce the size of the device and further lower cost.

Eighth Embodiment

Figure 8:
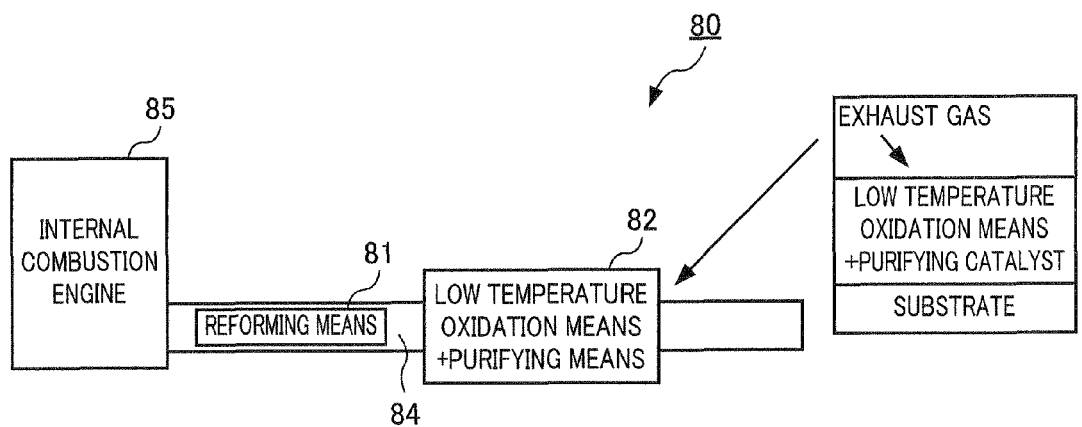
FIG. 8 is a schematic diagram of an exhaust gas cleaner of a eighth embodiment.

A schematic diagram of an exhaust gas cleaner 80 of the present embodiment is shown in FIG. 8. As shown in FIG. 8, the exhaust gas cleaner 80 is a configuration similar to the exhaust gas cleaner 70 of the seventh embodiment, except for a reforming means 81 being provided inside an exhaust channel 84.

According to the exhaust gas cleaner 80 of the present embodiment, in addition to exerting similar effects to the exhaust gas cleaner 70 of the seventh embodiment, it becomes possible to further reduce the size of the device and lower the cost from the reforming means 81 being provided inside the exhaust channel 84.

Ninth Embodiment

Figure 9:
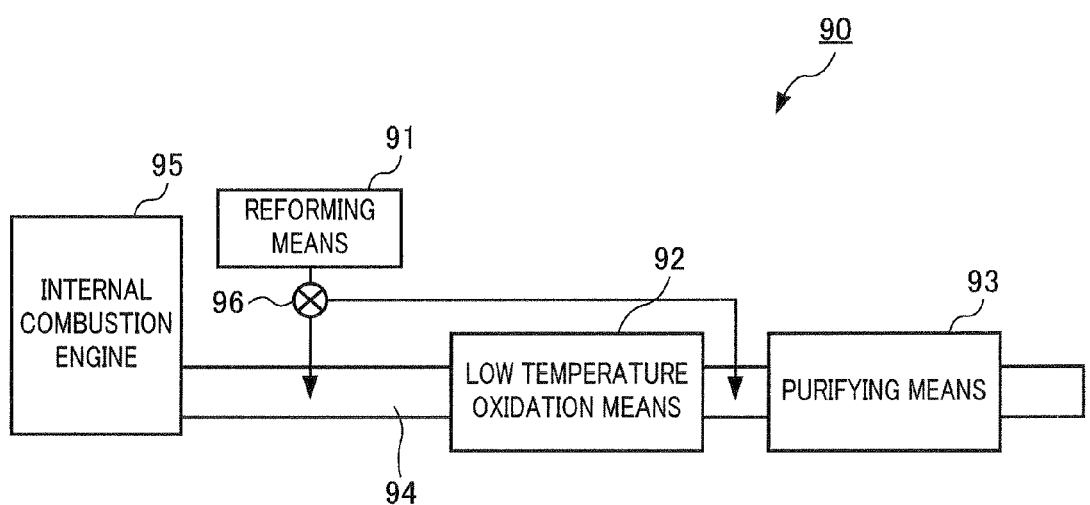
FIG. 9 is a schematic diagram of an exhaust gas cleaner of a ninth embodiment.

A schematic diagram of an exhaust gas cleaner 90 of the present embodiment is shown in FIG. 9. As shown in FIG. 9, the exhaust gas cleaner 90 is a configuration similar to the exhaust gas cleaner 10 of the first embodiment, except for a reforming means 91 further including an introduction means 96 that directly introduces reformed gas to a purifying means 93. The introduction means 96 preferably is an adjusting valve that switches a flow path.

According to the exhaust gas cleaner 90 of the present embodiment, the purifying means 93 is disposed in a latter part of the low temperature oxidation means 92, and even in the case of situation having occurred in which a majority of the hydrogen and carbon monoxide in the low temperature oxidation means 92 has been consumed, it is possible to efficiently purify the nitrogen oxides in the purifying means 93 because hydrogen and carbon monoxide can be supplied directly to the purifying means 93.

EXAMPLES

Although examples of the present invention are explained in detail below, the present invention is not to be limited to these examples.

Preparation of Reforming Catalyst (a) A reforming catalyst was prepared as a reforming means. First, deionized water was added to 125 g of $CeO_2$ (made by Nikki Co., cerium oxide) and 25 g of a 5% nitric acid rhodium solution (made by Kojima Chemicals Co., Ltd.), excess moisture was removed in a rotary evaporator, and calcining was performed for 2 hours at 200° C. in a drying furnace, and 2 hours at 600° C. in a muffle furnace.

(b) A slurry was obtained by mixing 45 g of the fine powder thus obtained by calcining, 25 g of alumina binder (made by Nissan Chemical Industries, Ltd., $Al_2O_3$, 20% concentration), and deionized water.

(c) A 50 mm diameter×35 mm length (67 cc), 400 cpsi, 3.5 mil honeycomb substrate made of cordierite was immersed in this slurry. Next, the honeycomb substrate was extracted from the slurry, and after an excess part thereof was removed with compressed air, the honeycomb substrate was heated for 2 hours at 200° C. This procedure was repeated until a predetermined loading amount was obtained. After the predetermined loading amount had been obtained, it was calcined in a muffle furnace for 2 hours at 500° C. As a result, a 1% by mass $Rh/CeO_2$ loaded honeycomb with a washcoat amount of 100 g/L was obtained as a reforming catalyst.

Preparation of Low Temperature Oxidation Catalyst I (a) A low temperature oxidation catalyst I was prepared as a low temperature oxidation means. First, a NaOH aqueous solution was prepared by placing 40 g of NaOH and 1500 ml of deionized water in a 2-L beaker, and the solution temperature was maintained at 70° C. by a heater.

(b) 40 g of a 5% by mass palladium nitrate solution, 10.38 g of a 5.01% by mass rhodium nitrate solution, 94.55 g of cerium nitrate 6-hydrate, and 300 ml of deionized water were placed in a 500-ml beaker, and the pH value of this solution was prepared by adding nitric acid so as to become approximately 1.0.

(c) While agitating the solution of (a), the solution of (b) was dropped into the solution of (a) so as to be 2 drops per second. At this time, the pH value of the solution of (a) was set so as not to become 10 or less. If it became 10 or less, NaOH would be added thereto. In addition, caution was taken so that the solution of (a) did not become 65° C. or less.

(d) After dropping of the solution of (b) had completely finished, the product inside the solution of (a) was filtered, and washed with 2 L of deionized water.

(e) The product thus filtered was dried in a dryer at 200° C. for 12 hours.

(f) A fine powder of low temperature oxidation catalyst was obtained by calcining the product thus dried in a muffle furnace for 5 hours at 500° C.

(g) A slurry was obtained by mixing 30 g of the fine powder of low temperature oxidation catalyst, 15 g of alumina binder ($Al_2O_3$ concentration 20%), and 60 g of deionized water.

(h) After immersing a 30-cc honeycomb substrate in this slurry, the honeycomb substrate was extracted from the slurry, and an excess part thereof was removed with compressed air. Subsequently, the honeycomb substrate was heated for 2 hours at 200° C. This procedure was repeated until a predetermined loading amount of 200 g/L was obtained. After the predetermined loading amount had been obtained, it was calcined in a muffle furnace for 2 hours at 500° C. As a result, a low temperature oxidation catalyst I was obtained having a palladium loading of S % by mass and a rhodium loading of 1.3% by mass with a washcoat amount of 200 g/L.

Preparation of Purifying Catalyst I (a) A purifying catalyst I was prepared as a purifying means. First, deionized water was added to 38.8 g of cerium oxide, 38.8 g of a complex oxide of cerium, praseodymium, and lanthanum, 19.4 g of alumina, and 58.2 g of a diammine dinitro Pt solution (Pt: 5% by mass). Next, excess moisture was removed in a rotary evaporator, and calcining was performed for 2 hours at 200° C. in a drying furnace, and 2 hours at 450° C. in a muffle furnace.

(b) A slurry A was obtained by adding deionized water to 50 g of the fine powder obtained by calcining.

(c) A 25.4 mm diameter×60 mm length (30 cc), 400 cpsi, 3.5 mil honeycomb substrate made of cordierite was immersed in this slurry A. Next, this honeycomb substrate was extracted from the slurry, and after removing an excess part thereof with compressed air, the honeycomb substrate was heated for 2 hours at 200° C. This procedure was repeated until a predetermined loading amount of 150 g/L was obtained. After the predetermined loading amount had been obtained, it was calcined in a muffle furnace for 2 hours at 500° C.

(d) A slurry B was obtained by adding deionized water to 41 g of Fe and Ce-ion exchanged β-zeolite, and 26.7 g of alumina binder ($Al_2O_3$, concentration 20%).

(e) The calcined body obtained in (c) was immersed in this slurry B. Next, this honeycomb substrate was extracted from the slurry, and after removing an excess part thereof with compressed air, the honeycomb substrate was heated for 2 hours at 200° C. This procedure was repeated until a predetermined loading amount of 75 g/L was obtained. After the predetermined loading amount had been obtained, it was calcined in a muffle furnace for 2 hours at 500° C. As a result, the purifying catalyst I was obtained. The composition of the purifying catalyst I thus obtained is shown in Table 1.

Preparation of Low Temperature Oxidation Catalyst II

A low temperature oxidation catalyst II was prepared as a low temperature oxidation means. For the fabrication of a honeycomb supporting the low temperature oxidation catalyst II, a similar procedure was performed as in the preparation of the low temperature oxidation catalyst I. In addition, in (b) of the preparation of the low temperature oxidation catalyst I, a similar procedure was performed as in the preparation of the low temperature oxidation catalyst I, except for changing to 2 g of a 5% by mass palladium nitrate solution, 10.38 g of a 5.01% by mass rhodium nitrate solution, 99.34 g of cerium nitrate 6-hydrate, and 300 ml of deionized water. As a result, a low temperature oxidation catalyst II was obtained having a palladium loading of 0.1% by mass with a washcoat amount of 200 g/L.

Preparation of Low Temperature Oxidation Catalyst III

A low temperature oxidation catalyst III was prepared as a low temperature oxidation means. For the fabrication of a honeycomb supporting the low temperature oxidation catalyst III, a similar procedure was performed as in the preparation of the low temperature oxidation catalyst I. In addition, in (b) of the preparation of the low temperature oxidation catalyst I, a similar procedure was performed as in the preparation of the low temperature oxidation catalyst I, except for changing to 80 g of a 5% by mass palladium nitrate solution, 10.38 g of a 5.01% by mass rhodium nitrate solution, 89.50 g of cerium nitrate 6-hydrate, and 300 ml of deionized water. As a result, a low temperature oxidation catalyst III was obtained having a palladium loading of 10% by mass with a washcoat amount of 200 g/L.

Preparation of Purifying Catalyst II (a) 45 g of alumina powder, 25 g of alumina binder (made by Nissan Chemical Industries, Ltd., $Al_2O_3$, concentration 20%), and 150 g of deionized water were placed in a polyethylene container (250 ml), and was wet pulverized for 14 hours to obtain a slurry. A 25.4 mm diameter×60 mm length (30 cc), 400 cpsi, 3.5 mil honeycomb substrate made of cordierite was immersed in this slurry. Next, the honeycomb substrate was extracted from the slurry, and after removing an excess part thereof with compressed air, the honeycomb substrate was heated for 2 hours at 200° C. This procedure was repeated until a predetermined loading amount was obtained. After the predetermined loading amount had been obtained, it was calcined in a muffle furnace for 2 hours at 500° C. Alumina of 200 g/L was thus coated on the honeycomb.

(b) Subsequently, a slurry was obtained by mixing cerium nitrate, sodium nitrate, potassium nitrate, and titania sol so as to make cerium:sodium:potassium:titanium=6:3:3:4 (mass ratio), and adding deionized water thereto. The alumina loaded honeycomb prepared in (a) was immersed in this slurry. Next, the honeycomb substrate was extracted from the slurry, and after removing an excess part thereof with compressed air, it was heated for 2 hours at 200° C. This procedure was repeated until a predetermined loading amount was obtained. After the predetermined loading amount had been obtained, it was calcined in a muffle furnace for 1 hour at 1500° C. The honeycomb was thereby coated with 26.7 g/L.

(c) Subsequently, a mixed solution was obtained by mixing a diammine dinitro platinum nitrate solution and a rhodium nitrate solution so as to make platinum:rhodium=19:1 (mass ratio), and adding deionized water thereto. The honeycomb prepared in (b) was immersed in this mixed solution. Next, the honeycomb substrate was extracted from the mixed solution, and after removing an excess part thereof with compressed air, the honeycomb substrate was heat for 2 hours at 200° C. This procedure was repeated until a predetermined loading amount was obtained. After the predetermined loading amount had been obtained, it was calcined in a muffle furnace for 2 hours at 450° C. The honeycomb was thereby coated with 4.0 g/L.

(d) A magnesium nitrate solution was obtained by adding deionized water to magnesium nitrate. The honeycomb prepared in (c) was immersed in this magnesium nitrate solution. Next, the honeycomb substrate was extracted from the mixed solution, and after removing an excess part thereof with compressed air, the honeycomb substrate was heated for 2 hours at 200° C. This procedure was repeated until a predetermined loading amount was obtained. After the predetermined loading amount had been obtained, it was calcined in a muffle furnace for 2 hours at 450° C. The honeycomb was thereby coated with 2.7 g/L.

As a result, an alkali adsorbent loaded honeycomb of 2.7Mg–(3.8Pt.0.2Rh)–(10Ce.5Na.5K.6.7Ti)/$Al_2O_3$ was obtained with a washcoat amount of 33.4 g/L and a noble metal loading of 4.0% by mass. Herein, the number before the chemical symbol is the mass (g) of an expressed metal component loaded per 1 L of honeycomb peripheral volume. The expression order indicates the order of loading, and is sequentially loaded from the component listed near $Al_2O_3$, and the components inside parenthesis express having been loaded simultaneously.

TABLE 1

| Composition | LNC [g/L] |
|---|---|
| Pt | Lower layer 4.5 |
| Rh | — |
| Pd | — |
| $CeO_2$ | Lower layer 60 |
| Fe, Ce Ion-exchanged β Zeolite | Upper layer 75 |
| $Al_2O_3$ | Upper layer 7 |
| | Lower layer 30 |

TABLE 1-continued

| Composition | LNC [g/L] |
|---|---|
| Binder | Lower layer 8 |
| Ce—Pr—La—Ox | Lower layer 60 |
| Zr—Nd—Ox | Lower layer 20 |

Reforming Performance Evaluation

Figure 10:
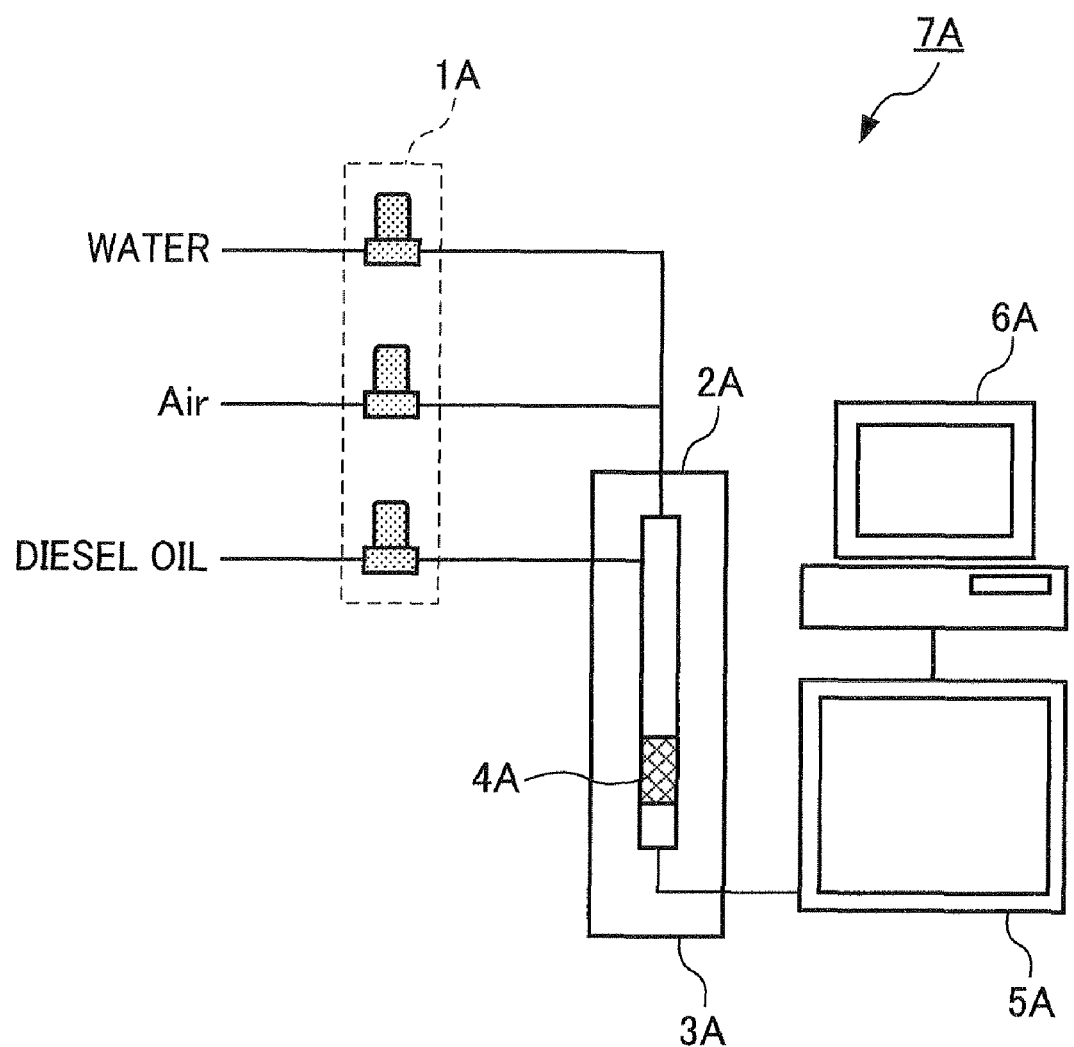
FIG. 10 is a schematic diagram of a reforming performance evaluation device.

The reforming performance evaluation indicated in reaction formulas 13 to 15 was performed using a reforming performance evaluation apparatus 7A shown in FIG. 10. A honeycomb on which a reforming catalyst 4A had been loaded was charged into a reactor 2A, and after heating up to 350° C. by way of a heater 3A, air, nitrogen, and steam were controlled in gas flow controllers 1A and introduced so as to make the reforming performance evaluation test conditions described later. Next, when the temperature was stable, diesel oil having a flow rate controlled to the below reforming performance test conditions was introduced. Thereafter, the heater 3A was regulated so that the temperature of the top end of the catalyst became 900° C. to 1000° C., and the concentrations of hydrogen and carbon monoxide were measured by way of a gas chromatograph when the temperature was stable. The gas chromatograph used was a GC390B made by GL Sciences, Inc., and in a case of using a TCD as a detector, it used a "Molecular Sieve 5A" as a column, and in the case of using FID as a detector, it used "Porapak Q" as a column.

The test conditions of the reforming performance evaluation tests will be explained. For the diesel oil, US standard diesel oil (made by Chevron Phillips, C/H=1.81) was used, and the same amount (4.25 g/min) was introduced in both the test example and comparative test examples. The introduction conditions of oxidant were set as shown below.

Test Example 1

The reforming performance evaluation test was performed by way of the partial oxidation reaction of reaction formula 13 using a model gas of the following composition. The evaluation results are shown in Table 2.
Model Gas Composition
  Air: 18.7 L/min
  O/C, 1.05

Comparative Test Example 1

The reforming performance evaluation test was performed by way of the autothermal reforming reaction of reaction formula 14 using a model gas of the following composition. The evaluation results are shown in Table 2.
Model Gas Composition
  Air: 16.0 L/min
  Steam: 40.2 g/min
  O/C, 0.9
  S/C, 0.95

Comparative Test Example 2

The reforming performance evaluation test was performed by way of the steam reforming reaction of reaction formula 15 using a model gas of the following composition. The evaluation results are shown in Table 2.
Model Gas Composition
  Steam: 126.8 g/min
  S/C, 3.0
  Nitrogen: 10 L/min

TABLE 2

| | Yield [%] | Reformed gas composition [%] | | CO/H2 [-] |
|---|---|---|---|---|
| | | H2 | CO | |
| Partial oxidation reaction | 80 | 20.8 | 24.0 | 1.2 |
| Autothermal reforming reaction | 83 | 28.0 | 16.3 | 0.6 |
| Steam reforming reaction | 87 | 42.2 | 12.6 | 0.3 |

As shown in Table 2, the reformed gas obtained from the partial oxidation reaction such as of test example 1 is different from the reformed gas obtained from the autothermal reforming reaction and steam reforming reaction such as of the comparative test examples, and has been confirmed to contain more carbon monoxide than hydrogen.

Nitrogen Oxide Purification Performance Evaluation

Figure 11:
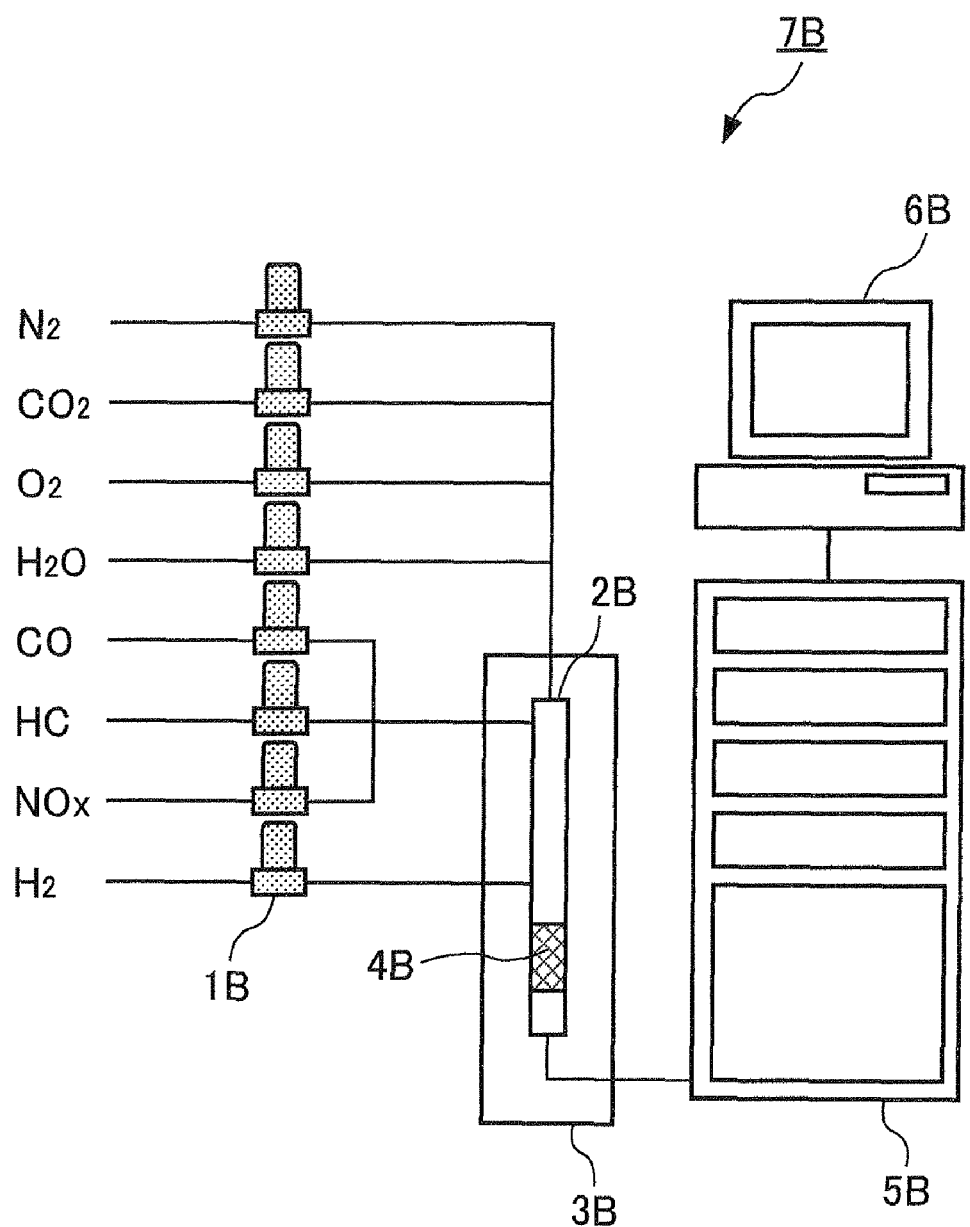
FIG. 11 is a schematic diagram of a nitrogen oxide purification performance evaluation device.

In the evaluation of nitrogen oxide purification performance, a nitrogen oxide purification performance evaluation apparatus 7B shown in FIG. 11 was used. More specifically, a honeycomb 4B on which a low temperature oxidation catalyst and a purifying catalyst had been loaded was charged into a reactor 2B, and each type of gas was allowed to flow in gas flow controllers 1B so as to satisfy the gas conditions below. Each type of gas was flowed into the reactor 2B and mixed, and heated to a predetermined temperature by way of a heater 3B. The temperature was measured from 50° C. up to 450° C. at 20° C./min. The measurement gas passed through the low temperature oxidation catalyst thus charged and was introduced to a gas analyzer 5B, and concentration measurement was performed. The nitrogen oxide concentration measured by the gas analyzer 5B was calculated in a PC 6B for data acquisition as an adsorption rate of each concentration using the following formula. It should be noted that concentration measurement of nitrogen oxide was sought with a nitrogen oxide concentration measurement device (made by Horiba) using a chemiluminescence method.

$$Anox=(Cnox\ in-Cnox\ out)/Cnox\ in\times100$$

[In the formula, Anox represents nitrogen oxide purification rate; Cnox in, catalyst inlet nitrogen oxide concentration; and Cnox out, catalyst outlet nitrogen oxide concentration.]

Example 1

Figure 12:
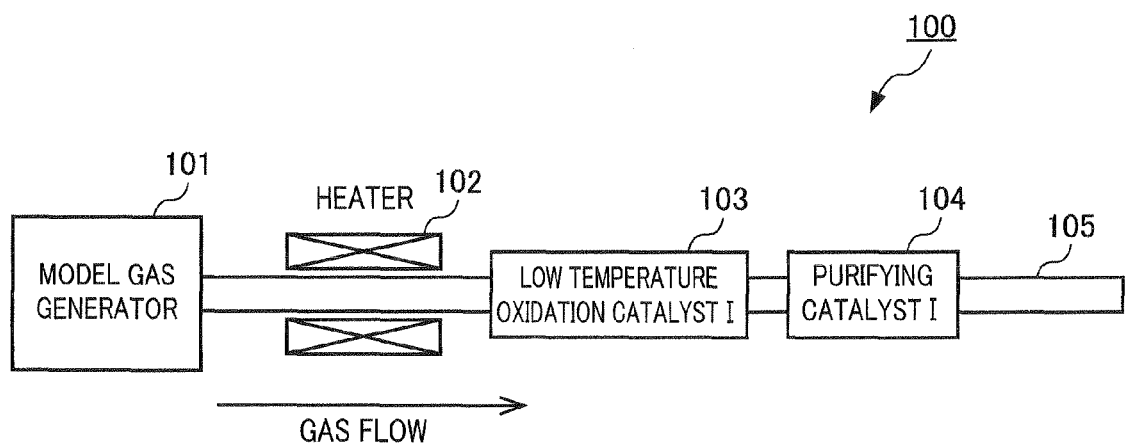
FIG. 12 is a schematic diagram of a layout of Example 1.
Figure 13:
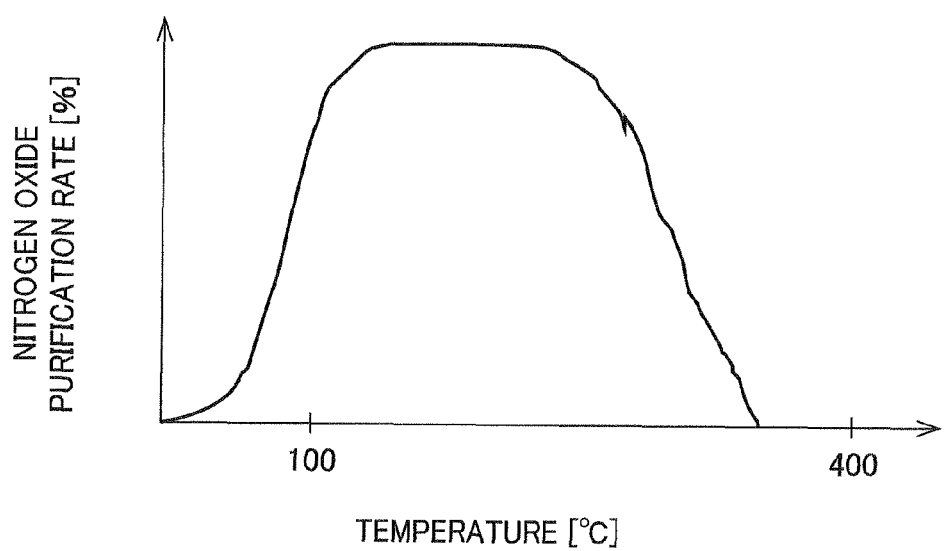
FIG. 13 is a graph showing evaluation results of Example 1.

Evaluation of nitrogen oxide purification performance was performed using a nitrogen oxide purification performance evaluation apparatus 7B by flowing model gas in the low temperature oxidation catalyst I and the purifying catalyst I. The layout of the present example is shown schematically in FIG. 12. It should be noted that the composition of the model gas was set as below. Based on the evaluation results, a relationship between gas temperature and nitrogen oxide purification rate is shown in FIG. 13.
Model Gas Composition
  NO: 90 ppm
  CO: 6000 ppm
  HC (propylene): 500 ppmC
  $O_2$: 10%
  $CO_2$: 6%
  $H_2O$: 7%
  $H_2$: 5000 ppm
  $N_2$: balance
  SV=50000 $h^{-1}$ According to the present example, the purification rate of nitrogen oxides has been confirmed to be high in a wide temperature range from a low temperature of 70° C. up to the vicinity of about 300° C., as shown in FIG. 13. According to the present example, this allows for purification of nitrogen oxides contained in exhaust gas in a wide temperature range from a low temperature.

Example 2

Figure 14:
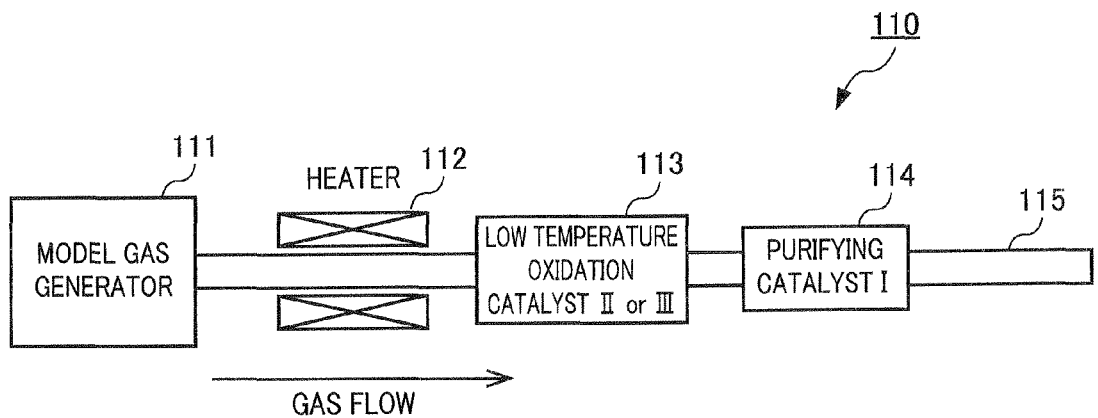
FIG. 14 is a schematic diagram of a layout of Example 2.
Figure 15:
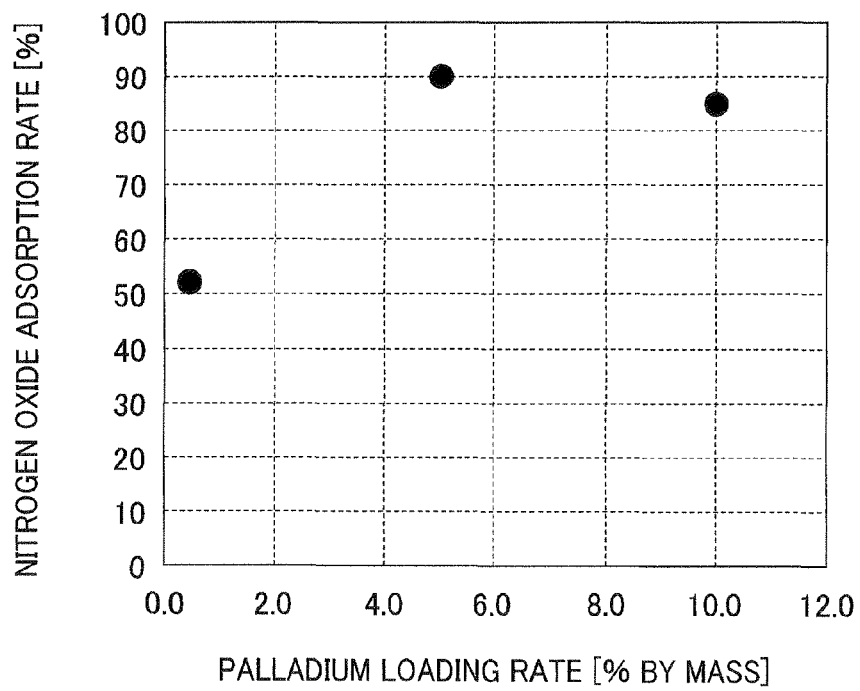
FIG. 15 is a graph showing evaluation results of Example 2.

The model gas composition was set similarly to Example 1, and evaluation of nitrogen oxide adsorption rate at 100° C. was performed when the low temperature oxidation catalyst I used in Example 1 was changed to the low temperature oxidation catalyst II or III. The layout of the present example is shown in FIG. 14. Based on the evaluation results, a relationship between palladium loading and nitrogen oxide adsorption rate is shown in FIG. 15. It should be noted that, in FIG. 15, the palladium loading of the low temperature oxidation catalyst I is 5% by mass, the low temperature oxidation catalyst II is 0.1% by mass, and the low temperature oxidation catalyst III is 10% by mass.

According to the present example, it has been confirmed that a high nitrogen oxide adsorption rate was obtained so long as the palladium loading of the low temperature oxidation catalyst was within the range of 0.1% by mass to 10% by mass, as shown in FIG. 15. According to the present example, this allows for more effective purification of nitrogen oxides contained in exhaust gas in a wide temperature range from a low temperature.

Example 3

The low temperature oxidation catalyst and the purifying catalyst were set similarly to Example 1, and the nitrogen oxide adsorption rate under 100° C. was evaluated when the total concentration of hydrogen and carbon monoxide in the model gas was within a range of 1100 ppm to 41000 ppm, the carbon monoxide concentration being within a range of 1000 ppm to 40000 ppm and the hydrogen concentration being within a range of 100 ppm to 40000 ppm. Based on the evaluation results, a relationship between the total concentration of hydrogen and carbon monoxide and the nitrogen oxide purification rate is shown in FIG. 16.

Figure 16:
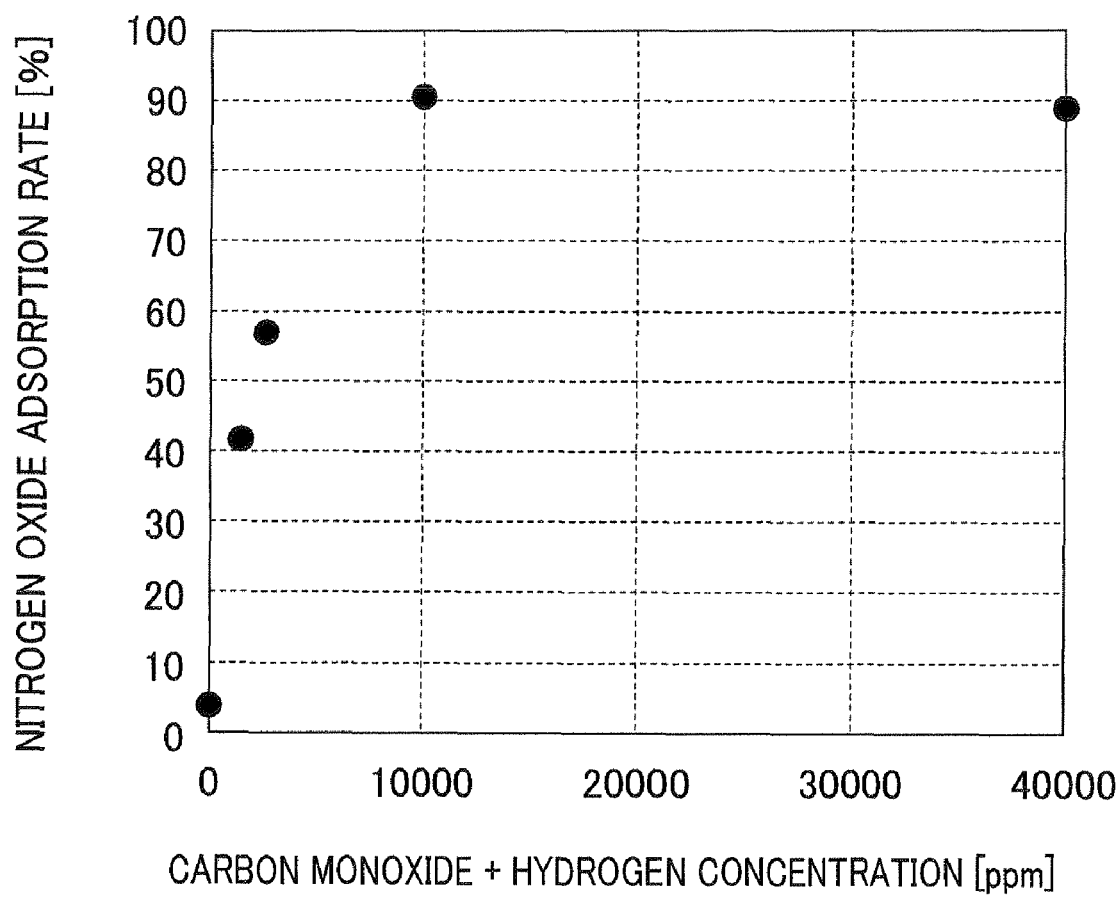
FIG. 16 is a graph showing evaluation results of Example 3.

It has been confirmed that the adsorption rate of nitrogen oxides is favorable in cases where the total concentration of hydrogen and carbon monoxide is within a range of 1100 ppm to 41000 ppm, as shown in FIG. 16. In addition, it has been confirmed that a high nitrogen oxide adsorption rate of about 90% is achieved, so long as the total concentration of hydrogen and carbon monoxide is within a range of 10000 ppm to 40000 ppm, which is more preferable.

Example 4

The low temperature oxidation catalyst and purifying catalyst were set similarly to Example 1, and the nitrogen oxide adsorption rate under 150° C. was evaluated when the oxygen concentration in the model gas was within a range of 0.3% to 15%. Based on the evaluation results, a relationship between oxygen concentration and nitrogen oxide purification rate is shown in FIG. 17.

Figure 17:
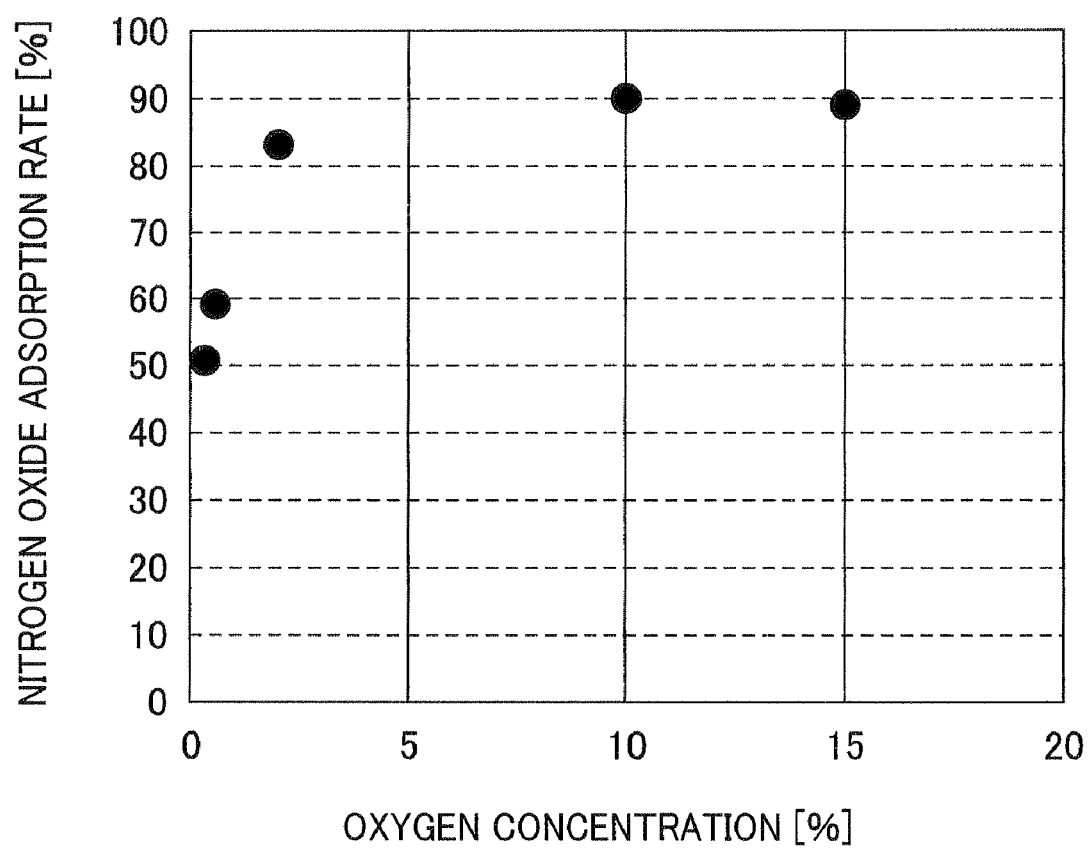
FIG. 17 is a graph showing evaluation results of Example 4.

It has been confirmed that the adsorption rate of nitrogen oxides is favorable in cases where the oxygen concentration is within a range of 0.3% to 15%, as shown in FIG. 17. In addition, it has been confirmed that a high nitrogen oxide adsorption rate of about 90% is obtained so long as the oxygen concentration is within a range of 5% to 15%, which is more preferable.

Example 5

Figure 18:
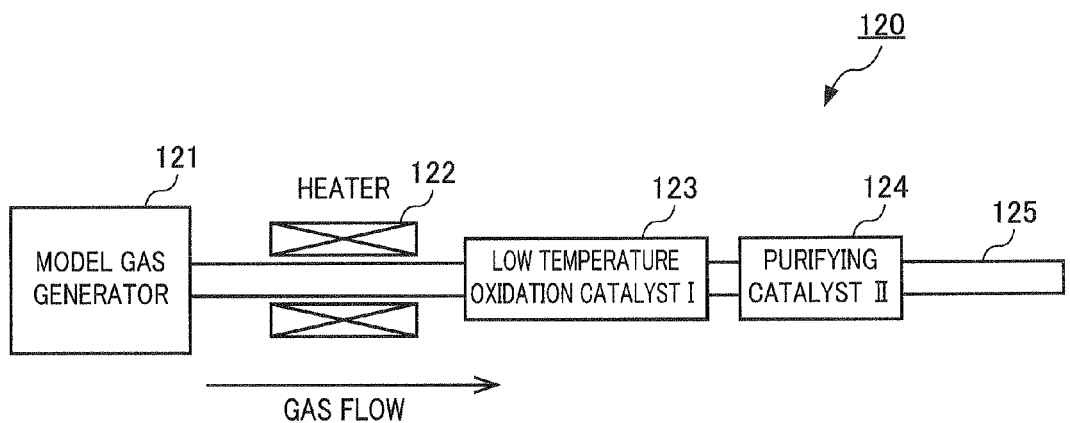
FIG. 18 is a schematic diagram of a layout of Example 5.
Figure 19:
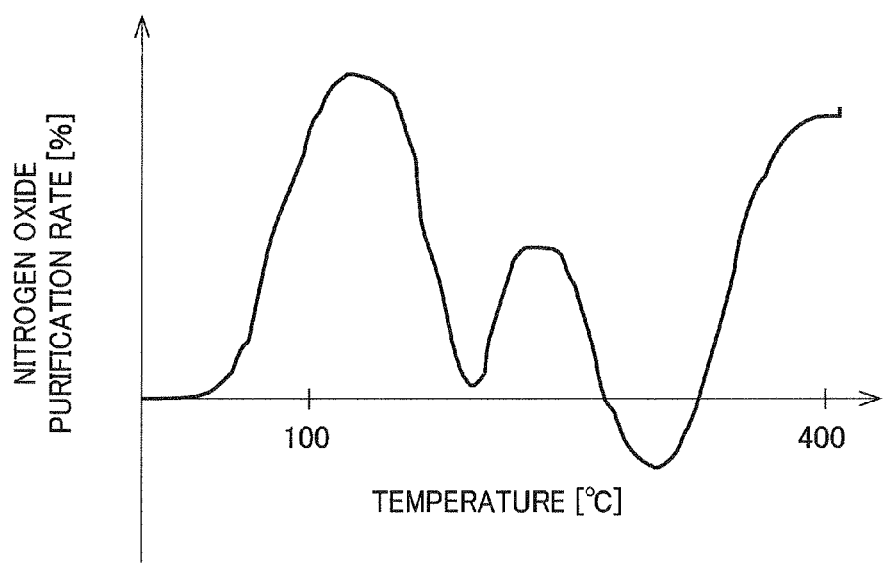
FIG. 19 is a graph showing evaluation results of Example 5.

The low temperature oxidation catalyst and model gas composition were set similarly to Example 1, and evaluation of the nitrogen oxide purification performance was performed by changing the purifying catalyst I used in Example I to the purifying catalyst II. The layout of the present example is shown schematically in FIG. 18. Based on the evaluation results, a relationship between gas temperature and nitrogen oxide purification rate is shown in FIG. 19.

When comparing FIG. 19 with FIG. 24 described below, the nitrogen oxide purification rate improves in the vicinity of 400° C. This is because, in the case of only the purifying catalyst II (not illustrated), a high nitrogen oxide purification rate is not obtained in the vicinity of 100° C., and in the case of only the low temperature oxidation catalyst, nitrogen oxides cannot be sufficiently purified in the vicinity of 400° C., and thus nitrogen oxides are emitted; however, according to the present example, the performance gaps of each can be filled by combining both.

Comparative Example 1

Evaluation of nitrogen oxide purification performance was performed on a catalyst similar to the catalyst used in Example 1 using model gas of the following composition. Based on the evaluation results, a relationship between gas temperature and nitrogen oxide purification rate is shown in FIG. 20.

Figure 20:
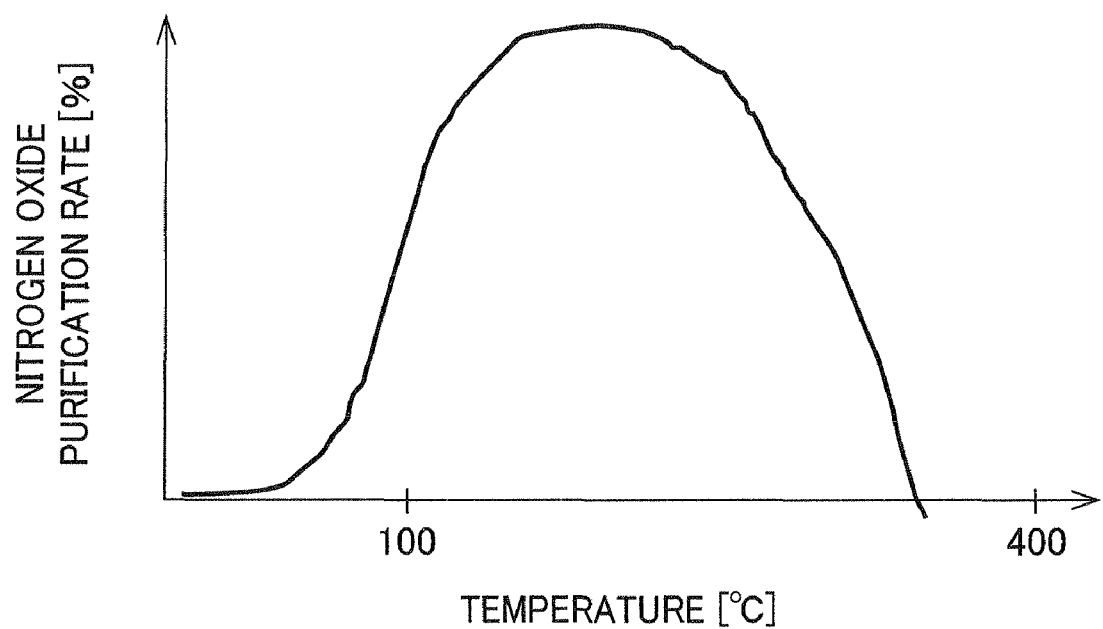
FIG. 20 is a graph showing evaluation results of Example 6.

Model Gas Composition
  NO: 90 ppm
  CO: 1000 ppm
  HC (propylene): 500 ppmC
  $O_2$: 10%
  $CO_2$: 6%
  $H_2O$: 7%
  $H_2$: 0 ppm
  $N_2$: balance
  SV=50000 $h^{-1}$ From the hydrogen concentration being 0 ppm in the present comparative example, it has been confirmed in particular that the nitrogen oxide purification rate in a low temperature range in the vicinity of 100° C. was low, and the temperature range exhibiting a high purification rate was narrow compared to Example 1, as shown in FIG. 20.

Comparative Example 2

Figure 21:
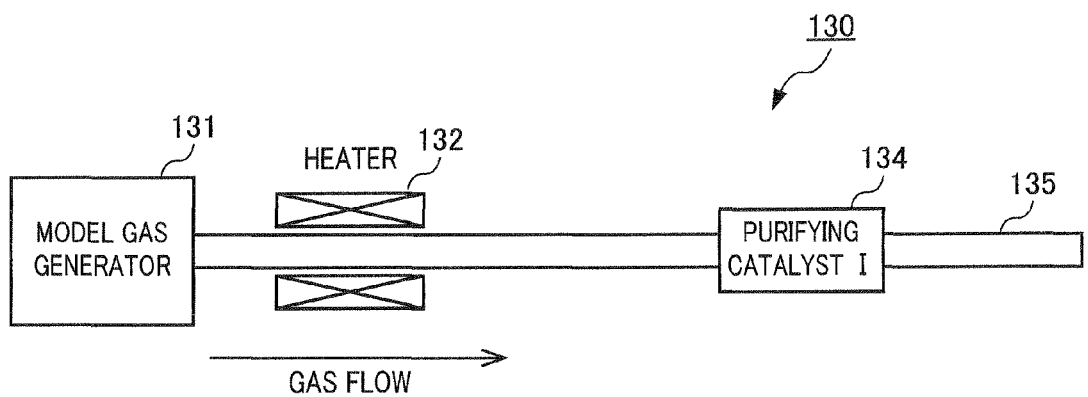
FIG. 21 is a schematic diagram of a layout of Example 7.

Evaluation of nitrogen oxide purification performance was performed using model gas of the following composition with the low temperature oxidation catalyst removed from the layout of Example 1, making a situation having only a purifying catalyst. The layout of the present comparative example is shown schematically in FIG. 21. Based on the evaluation results, a relationship between gas temperature and nitrogen oxide purification rate is shown in FIG. 22.

Figure 22:
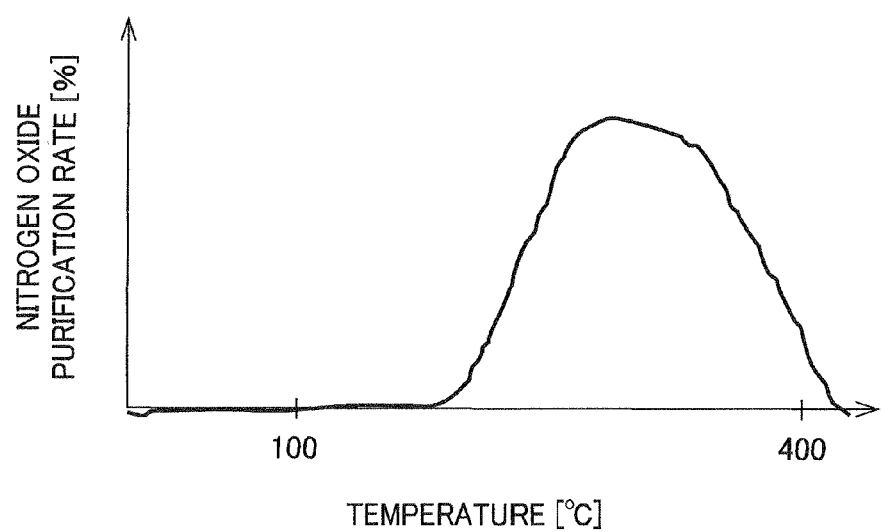
FIG. 22 is a graph showing evaluation results of Example 7.

Model Gas Composition
  NO: 90 ppm
  CO: 6000 ppm
  HC (propylene): 500 ppmC
  $O_2$: 10%
  $CO_2$: 6%
  $H_2O$: 7%
  $H_2$: 5000 ppm
  $N_2$: balance
  SV=50000 $h^{-1}$ From a low temperature oxidation catalyst not being arranged in the present comparative example, it has been confirmed in particular that the nitrogen oxide purification rate in a low temperature range was extremely low, and a high purification rate was not obtained if not around 300° C., compared to Example 1, as shown in FIG. 22. In addition, it has been confirmed that the temperature range in which a high purification rate is obtained is also narrow compared to Example 1.

Comparative Example 3

Figure 23:
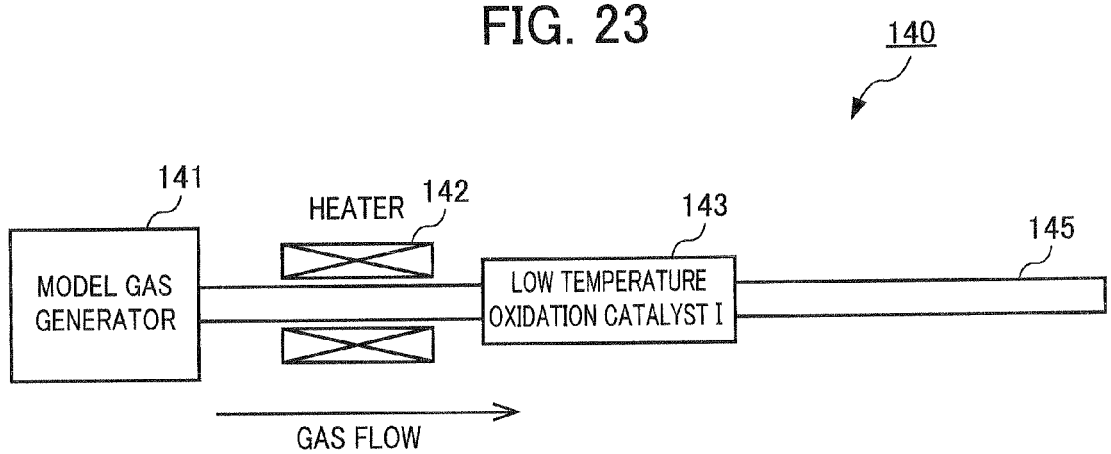
FIG. 23 is a schematic diagram of a layout of Example 8.

Evaluation of nitrogen oxide purification performance was performed using model gas of the following composition with the purifying catalyst removed from the layout of Example 1, making a situation having only a low temperature oxidation catalyst. The layout of the present comparative example is shown schematically in FIG. 23. Based on the evaluation results, a relationship between gas temperature and nitrogen oxide purification rate is shown in FIG. 24.

Figure 24:
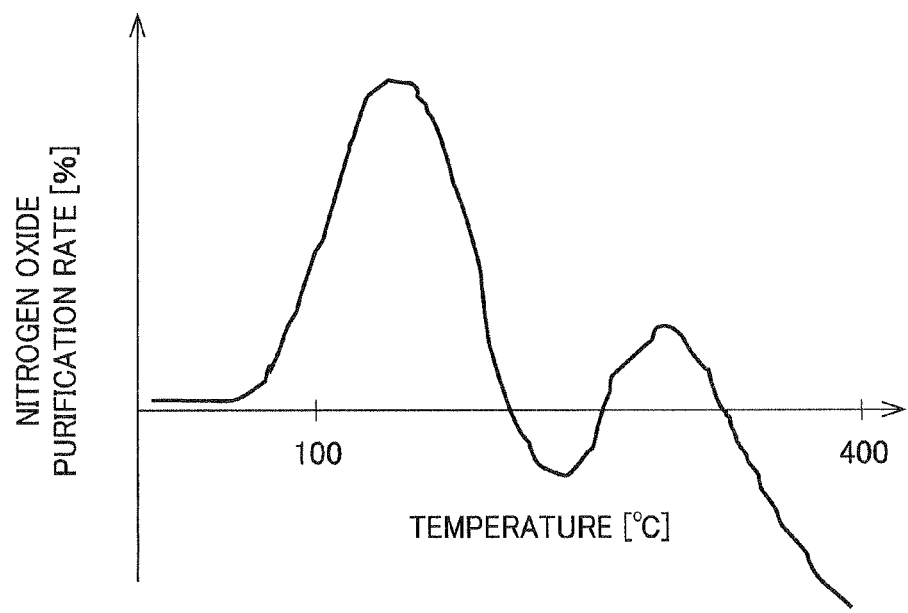
FIG. 24 is a graph showing evaluation results of Example 8.

Model Gas Composition
NO: 90 ppm
CO: 1000 ppm
HC (propylene): 500 ppmC
$O_2$: 10%
$CO_2$: 6%
$H_2O$: 7%
$N_2$: balance
$H_2$: 0 ppm
SV=50000 $h^{-1}$ From not arranging a purifying catalyst in the present comparative example, it has been confirmed that a high purification rate is obtained only in a small temperature range limited to around 150° C., as shown in FIG. 24.

The invention claimed is:

1. An exhaust gas cleaner used in exhaust gas purification of an internal combustion engine in which fuel is supplied under periodical rich or lean conditions, and caused to combust, the exhaust gas cleaner comprising:
a reforming means, which is provided independently to be separate from an exhaust channel, for producing a reformed gas containing hydrogen and carbon monoxide, and introducing into the exhaust channel of the internal combustion engine;
a low temperature oxidation means, which is provided inside the exhaust channel on a side further downstream than an introduction portion at which reformed gas is introduced by the reforming means, for oxidizing and adsorbing nitrogen oxides at a lower temperature than when the reforming means is not provided as well as oxidizing hydrogen and carbon monoxide, and for releasing nitrogen oxides adsorbed when 130° C. has been exceeded;
a purifying means, which is provided inside the exhaust channel on a side further downstream than the low temperature oxidation means, for adsorbing nitrogen oxides in a lean condition as well as releasing nitrogen oxides thus adsorbed in a rich condition, and for purifying nitrogen oxides thus released by employing hydrogen and carbon monoxide existing inside the exhaust channel; and
an introduction means for directly introducing reformed gas produced by the reforming means to the purifying means,
wherein the reforming means includes at least one type of metallic catalyst component selected from the group consisting of rhodium, platinum, palladium, nickel, cobalt, and iron, and a carrier oxide containing at least one type of oxide selected from the group consisting of ceria, alumina, zirconia, titania, magnesia, and zeolite, or a complex oxide,
wherein the low temperature oxidation means includes palladium, and at least one type of a carrier oxide component selected from the group consisting of alumina, silica, zirconia, titania, ceria, and zeolite, and at least one element selected from the group consisting of lanthanum, praseodymium, yttrium, and neodymium is added to the carrier oxide component,
wherein the purifying means includes: a catalyst component A containing (a) ceria, (b) praseodymium oxide, or (c) a mixture of oxides and/or a complex oxide of at least two elements selected from the group consisting of cerium, zirconium, praseodymium, neodymium, terbium, samarium, gadolinium, and lanthanum,
a catalyst component B containing at least one (d) noble metal catalyst component selected from the group consisting of platinum, rhodium, palladium, and oxides thereof, and
a catalyst component C containing either one or both of (e) a solid acid and (f) a solid acid on which an oxide of at least one metal selected from the group consisting of vanadium, tungsten, molybdenum, copper, iron, cobalt, nickel, and manganese is loaded, and
wherein the catalyst component B is dispersed on the catalyst component A.

2. An exhaust gas cleaner according to claim 1, wherein the reforming means mainly has a partial oxidation catalyst, and includes a fuel introduction means for introducing fuel from a fuel tank that stores fuel used in the internal combustion engine, and an oxygen introduction means for introducing oxygen containing gas.

3. An exhaust gas cleaner according to claim 1, wherein the low temperature oxidation means contains 0.1% by mass to 10% by mass of palladium.

4. An exhaust gas cleaner according to claim 1, wherein the low temperature oxidation means further contains platinum and/or rhodium.

5. An exhaust gas cleaner according to claim 1, further comprising a first concentration adjustment means for adjusting a hydrogen concentration in a mixed gas of reformed gas and exhaust gas flowing into the low temperature oxidation means to a range of 0.01% by volume to 4% by volume, and for adjusting a total concentration of hydrogen and carbon monoxide to a range of 0.02% by volume to 8.1% by volume.

6. An exhaust gas cleaner according to claim 1, further comprising a second concentration adjustment means for adjusting an oxygen concentration in a mixed gas of reformed gas and exhaust gas flowing into the low temperature oxidation means to a range of 0.3% by volume to 15% by volume.

7. An exhaust gas cleaner according to claim 1, wherein the purifying means includes a noble metal catalyst component containing at least one selected from the group consisting of platinum, rhodium, palladium, and oxides thereof, and a nitrogen oxide adsorption component containing at least one selected from the group consisting of alkali metals and alkali earth metals.

8. An exhaust gas cleaner used in exhaust gas purification of an internal combustion engine in which fuel is supplied under periodical rich or lean conditions, and caused to combust, the exhaust gas cleaner comprising: a reforming means for producing a reformed gas containing hydrogen and carbon monoxide, and introducing into an exhaust channel of the internal combustion engine;

a low temperature oxidation means, which is provided inside the exhaust channel on a side further downstream than an introduction portion at which reformed gas is introduced by the reforming means, for oxidizing and adsorbing nitrogen oxides at a lower temperature than when the reforming means is not provided as well as oxidizing hydrogen and carbon monoxide, and for releasing nitrogen oxides adsorbed when 130° C. has been exceeded; and a purifying means, which is provided in a vicinity of the low temperature oxidation means, for adsorbing nitrogen oxides in a lean condition as well as releasing nitrogen oxides thus adsorbed in a rich condition, and for purifying nitrogen oxides thus released by employing hydrogen and carbon monoxide existing inside a channel, wherein the low temperature oxidation means and the purifying means are provided inside the same converter that is provided with a substrate, and the purifying means is disposed on the substrate, and the low temperature oxidation means is disposed to be layered on the purifying means, wherein the reforming means includes at least one type of metallic catalyst component selected from the group consisting of rhodium, platinum, palladium, nickel, cobalt, and iron, and a carrier oxide containing at least one type of oxide selected from the group consisting of ceria, alumina, zirconia, titania, magnesia, and zeolite, or a complex oxide, wherein the low temperature oxidation means includes palladium, and at least one type of a carrier oxide component selected from the group consisting of alumina, silica, zirconia, titania, ceria, and zeolite, and at least one element selected from the group consisting of lanthanum, praseodymium, yttrium, and neodymium is added to the carrier oxide component, wherein the purifying means includes:

a catalyst component A containing (a) ceria, (b) praseodymium oxide, or (c) a mixture of oxides and/or a complex oxide of at least two elements selected from the group consisting of cerium, zirconium, praseodymium, neodymium, terbium, samarium, gadolinium, and lanthanum, a catalyst component B containing at least one (d) noble metal catalyst component selected from the group consisting of platinum, rhodium, palladium, and oxides thereof, and a catalyst component C containing either one or both of (e) a solid acid and (f) a solid acid on which an oxide of at least one metal selected from the group consisting of vanadium, tungsten, molybdenum, copper, iron, cobalt, nickel, and manganese is loaded, and wherein the catalyst component B is dispersed on the catalyst component A.

9. An exhaust gas cleaner according to claim 8, wherein the reforming means mainly has a partial oxidation catalyst, and includes a fuel introduction means for introducing fuel from a fuel tank that stores fuel used in the internal combustion engine, and an oxygen introduction means for introducing oxygen containing gas.

10. An exhaust gas cleaner according to claim 9, wherein the reforming means is provided inside of the exhaust channel.

11. An exhaust gas cleaner according to claim 9, wherein the reforming means is provided independently to be separate from the exhaust channel.

12. An exhaust gas cleaner according to claim 8, wherein the reforming means is provided inside of the exhaust channel.

13. An exhaust gas cleaner according to claim 8, wherein the reforming means is provided independently to be separate from the exhaust channel.

14. An exhaust gas cleaner used in exhaust gas purification of an internal combustion engine in which fuel is supplied under periodical rich or lean conditions, and caused to combust, the exhaust gas cleaner comprising:

a reforming means for producing a reformed gas containing hydrogen and carbon monoxide, and introducing into an exhaust channel of the internal combustion engine;

a low temperature oxidation means, which is provided inside the exhaust channel on a side further downstream than an introduction portion at which reformed gas is introduced by the reforming means, for oxidizing and adsorbing nitrogen oxides at a lower temperature than when the reforming means is not provided as well as oxidizing hydrogen and carbon monoxide, and for releasing nitrogen oxides adsorbed when 130° C. has been exceeded; and a purifying means, which is provided in a vicinity of the low temperature oxidation means, for adsorbing nitrogen oxides in a lean condition as well as releasing nitrogen oxides thus adsorbed in a rich condition, and for purifying nitrogen oxides thus released by employing hydrogen and carbon monoxide existing inside a channel, wherein the low temperature oxidation means and the purifying means are provided inside the same converter that is provided with a substrate, and the low temperature oxidation means is disposed on the substrate, and the purifying means is disposed to be layered on the low temperature oxidation means, wherein the reforming means includes at least one type of metallic catalyst component selected from the group consisting of rhodium, platinum, palladium, nickel, cobalt, and iron, and a carrier oxide containing at least one type of oxide selected from the group consisting of ceria, alumina, zirconia, titania, magnesia, and zeolite, or a complex oxide, wherein the low temperature oxidation means includes palladium, and at least one type of a carrier oxide component selected from the group consisting of alumina, silica, zirconia, titania, ceria, and zeolite, and at least one element selected from the group consisting of lanthanum, praseodymium, yttrium, and neodymium is added to the carrier oxide component, wherein the purifying means includes:

a catalyst component A containing (a) ceria, (b) praseodymium oxide, or (c) a mixture of oxides and/or a complex oxide of at least two elements selected from the group consisting of cerium, zirconium, praseodymium, neodymium, terbium, samarium, gadolinium, and lanthanum, a catalyst component B containing at least one (d) noble metal catalyst component selected from the group consisting of platinum, rhodium, palladium, and oxides thereof, and a catalyst component C containing either one or both of (e) a solid acid and (f) a solid acid on which an oxide of at least one metal selected from the group consisting of vanadium, tungsten, molybdenum, copper, iron, cobalt, nickel, and manganese is loaded, and wherein the catalyst component B is dispersed on the catalyst component A.

15. An exhaust gas cleaner according to claim 14, wherein the reforming means mainly has a partial oxidation catalyst, and includes a fuel introduction means for introducing fuel from a fuel tank that stores fuel used in the internal combustion engine, and an oxygen introduction means for introducing oxygen containing gas.

16. An exhaust gas cleaner according to claim 14, wherein the reforming means is provided inside of the exhaust channel.

17. An exhaust gas cleaner according to claim 14, wherein the reforming means is provided independently to be separate from the exhaust channel.

* * * * *